(12) United States Patent
Sun et al.

(10) Patent No.: US 9,667,604 B2
(45) Date of Patent: *May 30, 2017

(54) TUNNEL INTERFACE FOR SECURING TRAFFIC OVER A NETWORK

(71) Applicant: Fortinet, Inc., Sunnyvale, CA (US)

(72) Inventors: Chih-Tiang Sun, San Jose, CA (US); Kiho Yum, Sunnyvale, CA (US); Abraham R. Matthews, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,897

(22) Filed: Jun. 16, 2016

(65) Prior Publication Data

US 2017/0093808 A1    Mar. 30, 2017

Related U.S. Application Data

(63) Continuation of application No. 15/008,270, filed on Jan. 27, 2016, now Pat. No. 9,391,964, which is a
(Continued)

(51) Int. Cl.
  *H04L 29/06*    (2006.01)
  *H04L 12/46*    (2006.01)

(52) U.S. Cl.
  CPC ...... *H04L 63/0428* (2013.01); *H04L 12/4641* (2013.01); *H04L 63/0209* (2013.01);
(Continued)

(58) Field of Classification Search
  CPC .. H04L 63/0428; H04L 63/0272; H04L 45/14
  See application file for complete search history.

(56) References Cited

U.S. PATENT DOCUMENTS

| 4,667,287 A | 5/1987 | Allen et al. |
| 5,201,049 A | 4/1993 | Shorter |
| (Continued) | | |

FOREIGN PATENT DOCUMENTS

| EP | 1050181 | 11/2007 |
| WO | 0015290 | 8/2000 |
| (Continued) | | |

OTHER PUBLICATIONS

Notice of Allowance for U.S. Appl. No. 09/952,520 mailed Jul. 26, 2012.
(Continued)

*Primary Examiner* — Chau Le
(74) *Attorney, Agent, or Firm* — Hamilton, DeSanctis & Cha LLP

(57) ABSTRACT

Methods and systems for a flexible, scalable hardware and software platform that allows a managed security service provider to easily provide security services to multiple customers are provided. According to one embodiment, a method is provided for delivering customized network services to subscribers of the service provider. A request is received, at a service management system (SMS) of the service provider, to establish an Internet Protocol (IP) connection between a first and second location of a first subscriber of the managed security service provider. Responsive to the request, the SMS causes a tunnel to be established between a first and second service processing switch of the service provider which are coupled in communication via a public network and associated with the first location and the second location, respectively.

14 Claims, 15 Drawing Sheets

Related U.S. Application Data continuation of application No. 14/866,883, filed on Sep. 26, 2015, now Pat. No. 9,258,280, which is a continuation of application No. 14/543,797, filed on Nov. 17, 2014, now Pat. No. 9,160,716, which is a continuation of application No. 14/178,215, filed on Feb. 11, 2014, now Pat. No. 9,124,555, which is a continuation of application No. 13/585,727, filed on Aug. 14, 2012, now Pat. No. 8,650,390, which is a continuation of application No. 09/952,520, filed on Sep. 13, 2001, now Pat. No. 8,250,357.

(60) Provisional application No. 60/232,577, filed on Sep. 13, 2000, provisional application No. 60/232,516, filed on Sep. 14, 2000.

(52) U.S. Cl.
CPC ........ *H04L 63/029* (2013.01); *H04L 63/0272* (2013.01); *H04L 63/0471* (2013.01)

(56) References Cited

U.S. PATENT DOCUMENTS

| | | |
|---|---|---|
| 5,371,852 A | 12/1994 | Attanasio et al. |
| 5,400,331 A | 3/1995 | Lucak et al. |
| 5,442,708 A | 8/1995 | Adams et al. |
| 5,473,599 A | 12/1995 | Li et al. |
| 5,490,252 A | 2/1996 | Macera et al. |
| 5,581,705 A | 12/1996 | Passint et al. |
| 5,606,668 A | 2/1997 | Shwed |
| 5,633,866 A | 5/1997 | Callon |
| 5,745,778 A | 4/1998 | Alfieri |
| 5,812,779 A | 9/1998 | Ciscon et al. |
| 5,812,819 A * | 9/1998 | Rodwin ............ H04L 29/12311 703/23 |
| 5,825,772 A | 10/1998 | Dobbins et al. |
| 5,825,891 A | 10/1998 | Levesque et al. |
| 5,835,726 A | 11/1998 | Shwed et al. |
| 5,841,973 A | 11/1998 | Kessler et al. |
| 5,841,990 A | 11/1998 | Picazo et al. |
| 5,875,290 A | 2/1999 | Bartfai et al. |
| 5,881,236 A * | 3/1999 | Dickey ..................... G06F 8/61 709/220 |
| 5,963,555 A | 10/1999 | Takase et al. |
| 5,964,847 A | 10/1999 | Booth et al. |
| 5,987,521 A | 11/1999 | Arrowood et al. |
| 6,014,382 A | 1/2000 | Takihiro et al. |
| 6,032,193 A | 2/2000 | Sullivan |
| 6,047,330 A | 4/2000 | Stracke |
| 6,058,429 A | 5/2000 | Ames et al. |
| 6,069,895 A | 5/2000 | Ayandeh |
| 6,081,508 A * | 6/2000 | West ................... H04L 12/5692 370/229 |
| 6,085,238 A | 7/2000 | Yuasa et al. |
| 6,098,110 A | 8/2000 | Witkowski et al. |
| 6,118,791 A | 9/2000 | Fichou et al. |
| 6,134,226 A | 10/2000 | Reed et al. |
| 6,137,777 A | 10/2000 | Vaid et al. |
| 6,147,970 A | 11/2000 | Troxel |
| 6,147,976 A | 11/2000 | Shand et al. |
| 6,169,739 B1 | 1/2001 | Isoyama |
| 6,169,793 B1 | 1/2001 | Godwin et al. |
| 6,172,980 B1 | 1/2001 | Flanders et al. |
| 6,172,991 B1 | 1/2001 | Mori |
| 6,173,333 B1 | 1/2001 | Jolitz et al. |
| 6,173,399 B1 | 1/2001 | Gilbrech |
| 6,175,867 B1 | 1/2001 | Taghadoss |
| 6,192,051 B1 | 2/2001 | Lipman |
| 6,220,768 B1 | 4/2001 | Barroux |
| 6,226,296 B1 | 5/2001 | Lindsey et al. |
| 6,226,788 B1 | 5/2001 | Schoening et al. |
| 6,243,580 B1 | 6/2001 | Garner |
| 6,249,519 B1 | 6/2001 | Rangachar |
| 6,260,072 B1 | 7/2001 | Rodriguez |
| 6,260,073 B1 | 7/2001 | Walker et al. |
| 6,266,695 B1 | 7/2001 | Huang et al. |
| 6,286,038 B1 | 9/2001 | Reichmeyer et al. |
| 6,295,297 B1 | 9/2001 | Lee |
| 6,298,130 B1 | 10/2001 | Galvin |
| 6,304,975 B1 | 10/2001 | Shipley |
| 6,320,859 B1 | 11/2001 | Momirov |
| 6,330,602 B1 | 12/2001 | Law et al. |
| 6,338,092 B1 | 1/2002 | Chao et al. |
| 6,381,644 B2 | 4/2002 | Munguia et al. |
| 6,397,253 B1 | 5/2002 | Quinlan et al. |
| 6,405,262 B1 | 6/2002 | Vogel et al. |
| 6,414,595 B1 | 7/2002 | Scrandis et al. |
| 6,430,184 B1 | 8/2002 | Robins et al. |
| 6,434,619 B1 | 8/2002 | Lim et al. |
| 6,438,612 B1 | 8/2002 | Ylonen et al. |
| 6,449,650 B1 | 9/2002 | Westfall et al. |
| 6,453,406 B1 | 9/2002 | Sarnikowski et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,496,935 B1 | 12/2002 | Fink et al. |
| 6,532,088 B1 | 3/2003 | Dantu et al. |
| 6,542,466 B1 | 4/2003 | Pashtan et al. |
| 6,556,544 B1 | 4/2003 | Lee |
| 6,556,547 B1 | 4/2003 | Srikanth et al. |
| 6,597,956 B1 | 7/2003 | Aziz et al. |
| 6,606,315 B1 | 8/2003 | Albert et al. |
| 6,608,816 B1 | 8/2003 | Nichols |
| 6,609,153 B1 | 8/2003 | Salkewicz |
| 6,614,792 B1 | 9/2003 | Pazy et al. |
| 6,625,156 B2 | 9/2003 | Shaio et al. |
| 6,625,169 B1 | 9/2003 | Tofano |
| 6,631,519 B1 | 10/2003 | Nicholson et al. |
| 6,633,571 B1 | 10/2003 | Sakamoto et al. |
| 6,636,516 B1 | 10/2003 | Yamano |
| 6,639,897 B1 | 10/2003 | Shiomoto et al. |
| 6,640,248 B1 | 10/2003 | Jorgensen |
| 6,658,013 B1 | 12/2003 | de Boer et al. |
| 6,665,725 B1 | 12/2003 | Dietz et al. |
| 6,668,282 B1 | 12/2003 | Booth et al. |
| 6,674,756 B1 | 1/2004 | Rao et al. |
| 6,680,922 B1 | 1/2004 | Jorgensen |
| 6,687,220 B1 | 2/2004 | Ayres |
| 6,694,437 B1 | 2/2004 | Pao et al. |
| 6,697,359 B1 | 2/2004 | George |
| 6,697,360 B1 | 2/2004 | Gai et al. |
| 6,704,318 B1 | 3/2004 | Stuart et al. |
| 6,732,314 B1 | 5/2004 | Borella et al. |
| 6,738,371 B1 | 5/2004 | Ayres |
| 6,754,662 B1 | 6/2004 | Li |
| 6,775,267 B1 | 8/2004 | Kung et al. |
| 6,775,284 B1 | 8/2004 | Calvignac et al. |
| 6,816,462 B1 | 11/2004 | Booth et al. |
| 6,850,531 B1 | 2/2005 | Rao et al. |
| 6,856,676 B1 | 2/2005 | Pirot et al. |
| 6,862,279 B1 | 3/2005 | Imai et al. |
| 6,868,082 B1 | 3/2005 | Allen et al. |
| 6,883,170 B1 | 4/2005 | Garcia |
| 6,892,237 B1 | 5/2005 | Gai et al. |
| 6,901,517 B1 | 5/2005 | Redmore |
| 6,914,907 B1 | 7/2005 | Bhardwaj et al. |
| 6,922,774 B2 | 7/2005 | Meushaw et al. |
| 6,931,452 B1 | 8/2005 | Lamberton et al. |
| 6,938,095 B2 | 8/2005 | Basturk et al. |
| 6,938,097 B1 | 8/2005 | Vincent et al. |
| 6,944,128 B2 | 9/2005 | Nichols |
| 6,944,168 B2 | 9/2005 | Paatela et al. |
| 6,954,429 B2 | 10/2005 | Horton et al. |
| 6,982,984 B1 | 1/2006 | Asayesh et al. |
| 6,985,438 B1 | 1/2006 | Tschudin |
| 6,990,103 B1 | 1/2006 | Gollamudi |
| 6,999,454 B1 | 2/2006 | Crump |
| 7,002,965 B1 | 2/2006 | Cheriton |
| 7,003,581 B1 | 2/2006 | Lamberton et al. |
| 7,012,919 B1 | 3/2006 | So et al. |
| 7,020,143 B2 | 3/2006 | Zdan |
| 7,028,333 B2 | 4/2006 | Tuomenoksa et al. |

(56) References Cited

U.S. PATENT DOCUMENTS

| | | |
|---|---|---|
| 7,039,053 B1 | 5/2006 | Freed et al. |
| 7,042,843 B2 | 5/2006 | Ni |
| 7,042,848 B2 | 5/2006 | Santiago et al. |
| 7,046,665 B1 | 5/2006 | Walrand et al. |
| 7,058,716 B1 | 6/2006 | Sundaresan et al. |
| 7,062,570 B2 | 6/2006 | Hong et al. |
| 7,068,656 B2 | 6/2006 | Sainomoto et al. |
| 7,082,477 B1 | 7/2006 | Sadhasivam et al. |
| 7,096,383 B2 | 8/2006 | Talaugon et al. |
| 7,111,072 B1 | 9/2006 | Matthews et al. |
| 7,116,665 B2 | 10/2006 | Balay et al. |
| 7,116,679 B1 | 10/2006 | Ghahremani |
| 7,117,530 B1 * | 10/2006 | Lin .................... H04L 12/4641 726/14 |
| 7,136,351 B2 | 11/2006 | Metin et al. |
| 7,139,271 B1 | 11/2006 | Parruck et al. |
| 7,159,031 B1 | 1/2007 | Larkin et al. |
| 7,161,904 B2 | 1/2007 | Hussain et al. |
| 7,177,311 B1 | 2/2007 | Hussain et al. |
| 7,181,766 B2 | 2/2007 | Bendinelli et al. |
| 7,197,553 B2 | 3/2007 | Roberts et al. |
| 7,203,192 B2 | 4/2007 | Desai et al. |
| 7,225,259 B2 | 5/2007 | Ho et al. |
| 7,263,091 B1 | 8/2007 | Woo et al. |
| 7,266,120 B2 | 9/2007 | Cheng et al. |
| 7,269,157 B2 | 9/2007 | Klinker et al. |
| 7,272,643 B1 | 9/2007 | Sarkar et al. |
| 7,278,055 B2 | 10/2007 | Talaugon et al. |
| 7,340,535 B1 | 3/2008 | Alam |
| 7,359,404 B1 | 4/2008 | Allan |
| 7,376,125 B1 | 5/2008 | Hussain et al. |
| 7,376,827 B1 | 5/2008 | Jiao |
| 7,386,010 B2 | 6/2008 | Solomon et al. |
| 7,444,398 B1 | 10/2008 | Matthews |
| 7,463,633 B2 | 12/2008 | Endo et al. |
| 7,499,398 B2 | 3/2009 | Damon et al. |
| 7,522,604 B2 | 4/2009 | Hussain et al. |
| 7,574,495 B1 | 8/2009 | Rajagopalan |
| 7,587,633 B2 | 9/2009 | Talaugon et al. |
| 7,639,632 B2 | 12/2009 | Sarkar et al. |
| 7,668,087 B2 | 2/2010 | Hussain et al. |
| 7,720,053 B2 | 5/2010 | Hussain et al. |
| 7,720,095 B2 | 5/2010 | Desai et al. |
| 7,746,873 B2 | 6/2010 | Saito et al. |
| 7,801,155 B2 | 9/2010 | Wang |
| 7,830,787 B1 | 11/2010 | Wijnands et al. |
| 7,957,407 B2 | 6/2011 | Desai et al. |
| 8,064,462 B2 | 11/2011 | Hussain et al. |
| 8,068,503 B2 | 11/2011 | Desai et al. |
| 8,085,776 B2 | 12/2011 | Balay et al. |
| 8,111,690 B2 | 2/2012 | Hussain et al. |
| 8,250,357 B2 | 8/2012 | Sun et al. |
| 8,260,918 B2 | 9/2012 | Matthews et al. |
| 8,306,040 B2 | 11/2012 | Desai et al. |
| 8,503,463 B2 | 8/2013 | Desai et al. |
| 8,542,595 B2 | 9/2013 | Hussain et al. |
| 8,583,800 B2 | 11/2013 | Matthews et al. |
| 8,638,802 B2 | 1/2014 | Desai et al. |
| 8,650,390 B2 | 2/2014 | Sun et al. |
| 8,848,718 B2 | 9/2014 | Hussain et al. |
| 9,019,833 B2 | 4/2015 | Hussain et al. |
| 9,124,555 B2 | 9/2015 | Sun et al. |
| 9,143,351 B2 | 9/2015 | Millet |
| 9,160,716 B2 | 10/2015 | Sun et al. |
| 9,185,050 B2 | 11/2015 | Desai et al. |
| 9,331,961 B2 | 5/2016 | Desai et al. |
| 9,391,964 B2 | 7/2016 | Sun et al. |
| 2001/0000194 A1 | 4/2001 | Sequeira |
| 2001/0033580 A1 | 10/2001 | Dorsey et al. |
| 2001/0043571 A1 | 11/2001 | Jang et al. |
| 2001/0048661 A1 | 12/2001 | Clear et al. |
| 2001/0052013 A1 | 12/2001 | Munguia et al. |
| 2002/0049902 A1 | 4/2002 | Rhodes |
| 2002/0062344 A1 | 5/2002 | Ylonen et al. |
| 2002/0066034 A1 | 5/2002 | Schlossberg et al. |
| 2002/0075901 A1 | 6/2002 | Perlmutter et al. |
| 2002/0097672 A1 | 7/2002 | Barbas et al. |
| 2002/0097730 A1 | 7/2002 | Langille et al. |
| 2002/0099849 A1 | 7/2002 | Alfieri et al. |
| 2002/0116501 A1 | 8/2002 | Ho et al. |
| 2002/0116529 A1 | 8/2002 | Hayden |
| 2002/0120720 A1 | 8/2002 | Moir |
| 2002/0126671 A1 | 9/2002 | Ellis et al. |
| 2002/0126672 A1 | 9/2002 | Chow et al. |
| 2002/0145981 A1 | 10/2002 | Klinker et al. |
| 2002/0150114 A1 | 10/2002 | Sainomoto et al. |
| 2002/0152373 A1 | 10/2002 | Sun et al. |
| 2002/0184387 A1 | 12/2002 | Yamaya et al. |
| 2002/0186661 A1 | 12/2002 | Santiago et al. |
| 2002/0188657 A1 | 12/2002 | Traversat et al. |
| 2002/0191604 A1 | 12/2002 | Mitchell et al. |
| 2002/0194378 A1 | 12/2002 | Foti |
| 2003/0026262 A1 | 2/2003 | Jarl |
| 2003/0033401 A1 | 2/2003 | Poisson et al. |
| 2003/0043792 A1 | 3/2003 | Carpini et al. |
| 2003/0051048 A1 | 3/2003 | Watson et al. |
| 2003/0055920 A1 | 3/2003 | Kakadia et al. |
| 2003/0063348 A1 | 4/2003 | Posey |
| 2003/0074388 A1 | 4/2003 | Pham et al. |
| 2003/0074473 A1 | 4/2003 | Pham et al. |
| 2003/0076838 A1 | 4/2003 | Shaio et al. |
| 2003/0081559 A1 | 5/2003 | Matuoka |
| 2003/0084219 A1 | 5/2003 | Yao et al. |
| 2003/0091021 A1 | 5/2003 | Trossen et al. |
| 2003/0093557 A1 | 5/2003 | Giraud et al. |
| 2003/0108041 A1 | 6/2003 | Aysan et al. |
| 2003/0112799 A1 | 6/2003 | Chandra et al. |
| 2003/0115308 A1 | 6/2003 | Best et al. |
| 2003/0117954 A1 | 6/2003 | De Neve et al. |
| 2003/0131228 A1 | 7/2003 | Twomey |
| 2003/0169747 A1 | 9/2003 | Wang |
| 2003/0174650 A1 | 9/2003 | Shankar et al. |
| 2003/0185226 A1 | 10/2003 | Tang et al. |
| 2003/0200295 A1 | 10/2003 | Roberts et al. |
| 2003/0212735 A1 | 11/2003 | Hicok et al. |
| 2003/0223361 A1 | 12/2003 | Hussain et al. |
| 2003/0223406 A1 | 12/2003 | Balay et al. |
| 2003/0223418 A1 | 12/2003 | Desai et al. |
| 2003/0223456 A1 | 12/2003 | DiMambro |
| 2004/0037279 A1 | 2/2004 | Zelig |
| 2004/0042416 A1 | 3/2004 | Ngo et al. |
| 2004/0095934 A1 | 5/2004 | Cheng et al. |
| 2004/0160900 A1 | 8/2004 | Lund et al. |
| 2004/0199567 A1 | 10/2004 | Lund et al. |
| 2004/0199568 A1 | 10/2004 | Lund |
| 2004/0199569 A1 | 10/2004 | Kalkunte et al. |
| 2005/0002417 A1 | 1/2005 | Kelly et al. |
| 2005/0018609 A1 | 1/2005 | Dally et al. |
| 2005/0047407 A1 | 3/2005 | Desai et al. |
| 2005/0188106 A1 | 8/2005 | Pirbhai et al. |
| 2006/0087969 A1 | 4/2006 | Santiago et al. |
| 2006/0140185 A1 | 6/2006 | Norman et al. |
| 2007/0064704 A1 | 3/2007 | Balay et al. |
| 2007/0109968 A1 | 5/2007 | Hussain et al. |
| 2007/0121579 A1 | 5/2007 | Matthews et al. |
| 2007/0127382 A1 | 6/2007 | Hussain et al. |
| 2007/0147368 A1 | 6/2007 | Desai et al. |
| 2007/0237172 A1 | 10/2007 | Zelig et al. |
| 2007/0291755 A1 | 12/2007 | Cheng et al. |
| 2008/0025214 A1 | 1/2008 | Bettink et al. |
| 2008/0028456 A1 | 1/2008 | O'Rourke et al. |
| 2008/0043764 A1 | 2/2008 | Ishizaki et al. |
| 2008/0049760 A1 | 2/2008 | Bergeron |
| 2008/0112318 A1 | 5/2008 | Groleau et al. |
| 2008/0259936 A1 | 10/2008 | Hussain et al. |
| 2009/0046728 A1 | 2/2009 | Matthews et al. |
| 2009/0073977 A1 | 3/2009 | Hussain et al. |
| 2009/0225759 A1 | 9/2009 | Hussain et al. |
| 2009/0238181 A1 | 9/2009 | Desai et al. |
| 2010/0011245 A1 | 1/2010 | Talaugon et al. |
| 2010/0220732 A1 | 9/2010 | Hussain et al. |
| 2010/0220741 A1 | 9/2010 | Desai et al. |
| 2011/0235649 A1 | 9/2011 | Desai et al. |
| 2012/0057460 A1 | 3/2012 | Hussain et al. |

(56) References Cited

U.S. PATENT DOCUMENTS

| | | | |
|---|---|---|---|
| 2012/0069850 | A1 | 3/2012 | Desai et al. |
| 2012/0099596 | A1 | 4/2012 | Balay et al. |
| 2012/0324216 | A1 | 12/2012 | Sun et al. |
| 2012/0324532 | A1 | 12/2012 | Matthews et al. |
| 2013/0297768 | A1 | 11/2013 | Singh |
| 2013/0308460 | A1 | 11/2013 | Hussain et al. |
| 2013/0315232 | A1 | 11/2013 | Desai et al. |
| 2015/0019859 | A1 | 1/2015 | Sun et al. |
| 2015/0095636 | A1 | 4/2015 | Sun et al. |
| 2015/0146730 | A1 | 5/2015 | Desai et al. |
| 2015/0195098 | A1 | 7/2015 | Cheng et al. |
| 2015/0229567 | A1 | 8/2015 | Hussain et al. |
| 2016/0021072 | A1 | 1/2016 | Sun et al. |
| 2016/0142384 | A1 | 5/2016 | Sun et al. |

FOREIGN PATENT DOCUMENTS

| | | |
|---|---|---|
| WO | 0076152 | 12/2000 |
| WO | 0163809 | 8/2001 |
| WO | 0223855 | 3/2002 |
| WO | 03103237 | 12/2002 |

OTHER PUBLICATIONS

Final Rejection or U.S Appl. No. 09/952,520 mailed Feb. 11, 2009.
Non-Final Rejection or U.S. Appl. No. 09/952,520 mailed May 30, 2008.
Final Rejection or U.S Appl. No. 09/952,520 mailed Nov. 28, 2007.
Non-Final Rejection or U.S. Appl. No. 09/952,520 mailed Mar. 14, 2005.
Lawrence J. Lang, James Watson; "Connecting Remote FDDI Installations with Single-Mode Fiber, Dedicated Lines, or SMDS"; Jul. 1990; ACM Press; ACM SIGCOMM Computer Communication Review, vol. 20, Issue 3; pp. 72-82.
IEEE Potentials Publication; Dec. 1995/Jan. 1996; pp. 6. "http://www.ece.uc.edu/.about.paw/potentials/sample".
Dennis Fowler; "VPNs Become a Virtual Reality"; Netnews, Apr./May 1998. pp. 1-4.
Notice of Allowance for U.S. Appl. No 14/178,215 mailed Jul. 15, 2015.
Notice of Allowance for U.S. Appl. No. 13/585,727 mailed Oct. 30, 2013.
Non-Final Rejection for U.S. Appl. No. 13/585,727 mailed Jun. 17, 2013.
Notice of Allowance for U.S. Appl. No. 14/543,797 mailed Sep. 1, 2015.
Notice of Allowance for U.S. Appl. No. 14/866,883 mailed Dec. 22, 2015.
Kapustka, K., et al., << CoSine Communications Moves VPNs 'Into the Cloud' with Leading Managed IP Service Delivery Platform, >> CoSine Communications http://www.cosinecom.com/news/pr_5_24.html, 5p., May 24, 1999.
Gasparro, D.M., "Next-Gen VPNs: The Design Challenge." Data Communications. Sep. 1999. pp. 83-95.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Hanaki, M. et al., "LAN/WAN management integration using ATM CNM interface." IEEE Network Operations Management Symposium, vol. 1. Apr. 1996. pp. 12-21.
Keshav, S., "An Engineering Approach to Computer Networking: ATM networks, the internet, and the telephone network." Reading Mass: Addison-Wesley, Addison-Wesley Professional Computing Series. 1992.
Kim, E.G. et al., "The Multi-Layer VPN Management Architecture." Proc. Sixth IFIP/IEEE International Symposium on Integrated Network Management. May 1999. pp. 187-200.
Tanenbaum, A.S., "Computer Networks." Upper Saddle River, N.J.: Prentice Hall PTR, 3rd Edition. 1996. pp. 348-364.
Zhang, et al. "Token Ring Arbitration Circuits for Dynamic Priority Algorithms." IEEE, 1995, pp. 74-77.
Rao, J.R., Intranets and VPNs: Strategic Approach. 1988 Annual Review of Communications. 1998. pp. 669-674.
Decasper, D. et al., "Router Plugins: A Software Architecture for Next-Generation Routers." IEEE/ACM Transactions on Networking. vol. 8, No. 1. Feb. 2000. 15 pgs.
International Search Report for PCTUS03/17674. 6 pgs., Published 2003.
Knight et al. "Virtual Router Redundancy Protocol." RFC 2338. Apr. 1998. 27 pgs.
European Search Report for PCT/US03/37009 (Jul. 4, 2004) 2 pgs.
Notice of Allowance for U.S. Appl. No. 15/008,270 mailed Jun. 9, 2016.

* cited by examiner

- HARDWARE:
  - 26-SLOT, TWO-SIDED CHASSIS ~831
  - 22 GBPS PACKET RING MIDPLANE ~832
  - THREE TYPES OF SERVICE BLADES ~239
    - CONTROL ~234
    - ACCESS ~238
    - PROCESSOR ~236
  - SPECIALIZED PROCESSING DAUGHTER CARDS FOR SERVICE BLADES
  - POWER SUPPLY SYSTEM ~241

- SOFTWARE:
  - IP NETWORK OPERATING SYSTEM (IPNOS) ~223
  - VIRTUAL ROUTING ~810
  - IP SERVICE SUITE ~820
    - IPSEC (DIAL AND DEDICATED) ~821
    - APPLICATION PROXY FIREWALL ~822
    - NETWORK ADDRESS TRANSLATION (NAT) ~823
    - PPTP TUNNEL TERMINATION ~824
    - BANDWIDTH MANAGEMENT ~825
    - MULTIPROTOCOL LABEL SWITCHING (MPLS) ~826
    - FRAME RELAY TO IPSEC INTERNETWORKING ~827

Fig. 8

TUNNEL INTERFACE FOR SECURING TRAFFIC OVER A NETWORK

CROSS-REFERENCE TO RELATED APPLICATIONS

This application is a continuation of U.S. patent application Ser. No. 15/008,270, filed Jan. 27, 2016, now U.S. Pat. No. 9,391,964, which is a continuation of U.S. patent application Ser. No. 14/866,883, filed Sep. 26, 2015, now U.S. Pat. No. 9,258,280, which is a continuation of U.S. patent application Ser. No. 14/543,797, filed Nov. 17, 2014, now U.S. Pat. No. 9,160,716, which is a continuation of U.S. patent application Ser. No. 14/178,215, filed Feb. 11, 2014, now U.S. Pat. No. 9,124,555, which is a continuation of U.S. patent application Ser. No. 13/585,727, filed Aug. 14, 2012, now U.S. Pat. No. 8,650,390, which is a continuation of U.S. patent application Ser. No. 09/952,520, filed Sep. 13, 2001, now U.S. Pat. No. 8,250,357, which claims the benefit of priority of U.S. Provisional Patent Application No. 60/232,516, filed Sep. 13, 2000 and U.S. Provisional Patent Application No. 60/232,577, filed on Sep. 13, 2000, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2000-2016, Fortinet, Inc.

BACKGROUND

Field

Embodiments of the present invention generally relate to the field of Internet processors. In particular, embodiments of the present invention relate to methods and apparatus for delivering security services, such as firewalls.

Description of the Related Art

The service provider game has grown extremely crowded and fiercely competitive, with numerous players offering similar products and services. While having a large number of comparable services is arguably beneficial to the enterprise, it poses a host of potentially disastrous consequences for a service provider. If all competitors in a given market are offering services that are indistinguishable by the customer base, the burden of differentiation falls squarely on cost, with the least-cost competitor emerging "victorious". Jockeying for the cost-leader position rapidly drives down service pricing, reducing margins to rubble and rendering the service a commodity. Furthermore, numerous offerings that are similar in attributes and cost make it very difficult to lock in customers.

Operational costs also present a significant challenge to service providers. Cumbersome, manual provisioning processes are the primary culprits. Customer orders must be manually entered and processed through numerous antiquated back-end systems that have been pieced together. Once the order has been processed, a truck roll is required for onsite installation and configuration of Customer Premises Equipment (CPE), as well as subsequent troubleshooting tasks. This is a slow and expensive process that cuts into margins and forces significant up-front charges to be imposed on the customer. In order to be successful in today's market, service providers must leverage the public network to offer high-value, differentiated services that maximize margins while controlling capital and operational costs. These services must be rapidly provisioned and centrally managed so that time-to-market and, more importantly, time-to-revenue are minimized. Traditional methods of data network service creation, deployment, and management present significant challenges to accomplishing these goals, calling for a new network service model to be implemented.

Basic Internet access, a staple of service provider offerings, has been commoditized to the point that margins are nearly non-existent. This fact has driven service providers to look for new value-added features and services to layer over basic connectivity so that they are able to differentiate on factors other than cost. The most significant opportunity for differentiation is found in managed network services. Managed network services enable enterprise IT organizations to outsource time-consuming tactical functions so that they can focus strategic core business initiatives.

Enterprise customers are now demanding cost-effective, outsourced connectivity and security services, such as Virtual Private Networks (VPNs) and managed firewall services. Enterprise networks are no longer segregated from the outside world; IT managers are facing mounting pressure to connect disparate business units, satellite sites, business partners, and suppliers to their corporate network, and then to the Internet. This raises a multitude of security concerns that are often beyond the core competencies of enterprise IT departments. To compound the problem, skilled IT talent is an extremely scarce resource. Service providers, with expert staff and world-class technology and facilities, are well positioned to deliver these services to enterprise customers.

While IT managers clearly see the value in utilizing managed network services, there are still barriers to adoption. Perhaps the most significant of these is the fear of losing control of the network to the service provider. In order to ease this fear, a successful managed network service offering must provide comprehensive visibility to the customer, enabling them to view configurations and performance statistics, as well as to request updates and changes. Providing IT managers with powerful Customer Network Management (CNM) tools bolsters confidence in the managed network service provider and can actually streamline the service provisioning and maintenance cycle.

Customer Premises Equipment (CPE)-Based Managed Firewall Services

Data network service providers have traditionally rolled out managed network service offerings by deploying specialized CPE devices at the customer site. This CPE is either a purpose-built network appliance that, in addition to providing specific service features, may also serve some routing function, or a mid to high-end enterprise-class server platform, typically UNIX-based. In the case of a managed firewall solution, the CPE device provides services that may include VPN tunnel termination, encryption, packet filtering, access control listings, and log files. The CPE at each customer site is aggregated at a multiplexer via leased lines and/or public Frame Relay PVCs (permanent virtual circuits) at the service provider POP (point of presence), then into a high-end access router and across the WAN (wide area network).

In many cases, service providers and enterprise customers find it too expensive and cumbersome to deploy CPE-based security at every site, but rather deploy secure Internet access points at one or two of the largest corporate sites. In this model, all remote site Internet traffic is backhauled across the WAN to the secure access point and then out onto the Internet, resulting in increased traffic on the corporate network and performance sacrifices.

Service providers face significant challenges when deploying, managing and maintaining CPE-based managed firewall services. When a customer expresses interest in utilizing such a service, a consultation with experienced security professionals is required to understand the corporate network infrastructure and site-specific security requirements, yielding a complex set of security policies. This may be accomplished through a set of conference calls or a number of on-site visits. Once the security requirements and policies have been identified, the service provider must procure the CPE device. In some cases, the equipment vendor may provide some level of pre-configuration based upon parameters supplied by the service provider. While CPE vendors are driving towards delivering fully templatized, pre-configured systems that are plug-and-play by enterprise staff, most service providers still assume the responsibility for on-site, hands-on configuration, and a truck-roll to each of the customer sites is necessary. This is particularly true in server-based CPE systems, where a relatively high degree of technical sophistication and expertise is required to install and configure a UNIX-based system.

Typically, a mid-level hardware and security specialist is sent onsite, along with an account manager, to complete the CPE installation and configuration. This specialist may be a service provider employee or a systems integrator/Value-Added Reseller (VAR) who has been contracted by the service provider to complete CPE rollout. This complex process begins with physical integration of the CPE device into the customer network. In the case of a CPE appliance, where the OS and firewall/VPN software components have been pre-loaded, the tech can immediately proceed to the system configuration phase. Server-based CPE services, however, require the additional time-consuming step of loading the system OS and software feature sets, adding a further degree of complexity.

In the configuration phase, the tech attempts to establish contact between the CPE device and central management system at the service provider NOC (network operations center). In cases where the device has not been previously assigned an IP address, an out-of-band signaling mechanism is required to complete the connection, typically a modem and a plain old telephone service (POTS) line. If the integration process has been successful, NOC staff should be able to take over the process, pushing specific policy configurations (and possibly an IP address) down to the CPE device through a browser-driven management interface. This entire process must be repeated for every enterprise site utilizing the managed-firewall service.

Additionally, maintenance processes and costs for CPE-based managed firewall services can also be overwhelming to both the service provider and enterprise customers. Enterprises are forced to either keep cold spares onsite or be faced with periods of absent security when their firewall fails, a situation that is unacceptable to most of today's information intensive corporations. Service providers must have an inventory of spares readily available, as well as staff resources that can, if necessary, go onsite to repeat the system configuration process. Troubleshooting thousands of CPE devices that have been deployed at customer sites is an extremely formidable challenge, requiring extensive call center support resources, as well technicians that can be quickly deployed onsite.

As CPE-based firewall services have traditionally been deployed in private enterprise networks, the original management systems for these devices have difficulty scaling up to manage several large, multi-site service provider customers. CPE device vendors are scrambling to ramp up these systems to carrier-grade and scale. Firewall management systems are typically GUI-based (graphical user interface-based), browser-driven interfaces that run on industrial grade UNIX platforms in the service provider NOC. The management system interfaces with the CPE devices based on IP address. The CPE-based managed firewall model faces service providers with another issue: capital costs. In addition to the significant costs required to build out a POP/access infrastructure, including multiplexers and high-capacity access routers, the service provider must also assume the initial costs of the CPE device, including firewall and VPN software licensing charges. In many cases, these costs are passed on to the customer. This creates steep up-front costs that, coupled with per-site installation charges, can present a serious barrier to service adoption. In markets where several service providers are offering managed firewall services, a service provider may absorb the CPE cost to obtain a price leadership position, cutting deeply into margins.

The CPE-based model is also limited when rolling out services beyond the managed firewall offering. New services, such as intrusion detection, may require additional hardware and/or software. This results in higher capital costs, as well as another expensive truck roll.

There is also a performance penalty in conventional IP-SEC-mode (Internet protocol secure mode) transmissions, in that each packet going through must be examined at the sending end of a transmission to determine whether it must be encrypted, and then each packet at the receiving end of the transmission to determine whether it must be decrypted.

Thus, there is a need for a method and apparatus of delivering a variety of network services, for example, security services, such as firewalls, and secure transmission of data across a network, such as the Internet.

SUMMARY

Methods and systems are described for a flexible, scalable hardware and software platform that allows a service provider to easily provide Internet services, virtual private network services, firewall services and the like to multiple customers. According to one embodiment, a method is provided for delivering customized network services to subscribers of a managed security service provider. A request is received, at a service management system (SMS) of the managed security service provider, to establish an Internet Protocol (IP) connection between a first location of a first subscriber of multiple subscribers of the managed security service provider and a second location of the first subscriber. Responsive to the request, the SMS causes a tunnel to be established between a first service processing switch of the managed service provider that is associated with the first location and a second service processing switch of the managed service provider that is associated with the second location. The first service processing switch and the second service processing switch are coupled in communication via a public network.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 8 is a block diagram of hardware elements and software elements in accordance with an embodiment of the present invention.

DETAILED DESCRIPTION

Methods and systems are described for a flexible, scalable hardware and software platform that allows a service provider to easily provide Internet services, virtual private network services, firewall services and the like to a plurality of customers.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention deploys one or more virtual private networks (VPNs) running on one or more carrier-class platforms that scale to provide cost-effective solutions for Internet service providers (ISPs). In particular, security services such as firewalls can be provided by the ISPs for services they provide to their customers, wherein a plurality of customers are hosted on a single network of processors. An ISP is providing hosting services (e.g., hosting an Internet web site for a customer) and routing (moving data to and from the Internet) for their customers.

Figure 1:
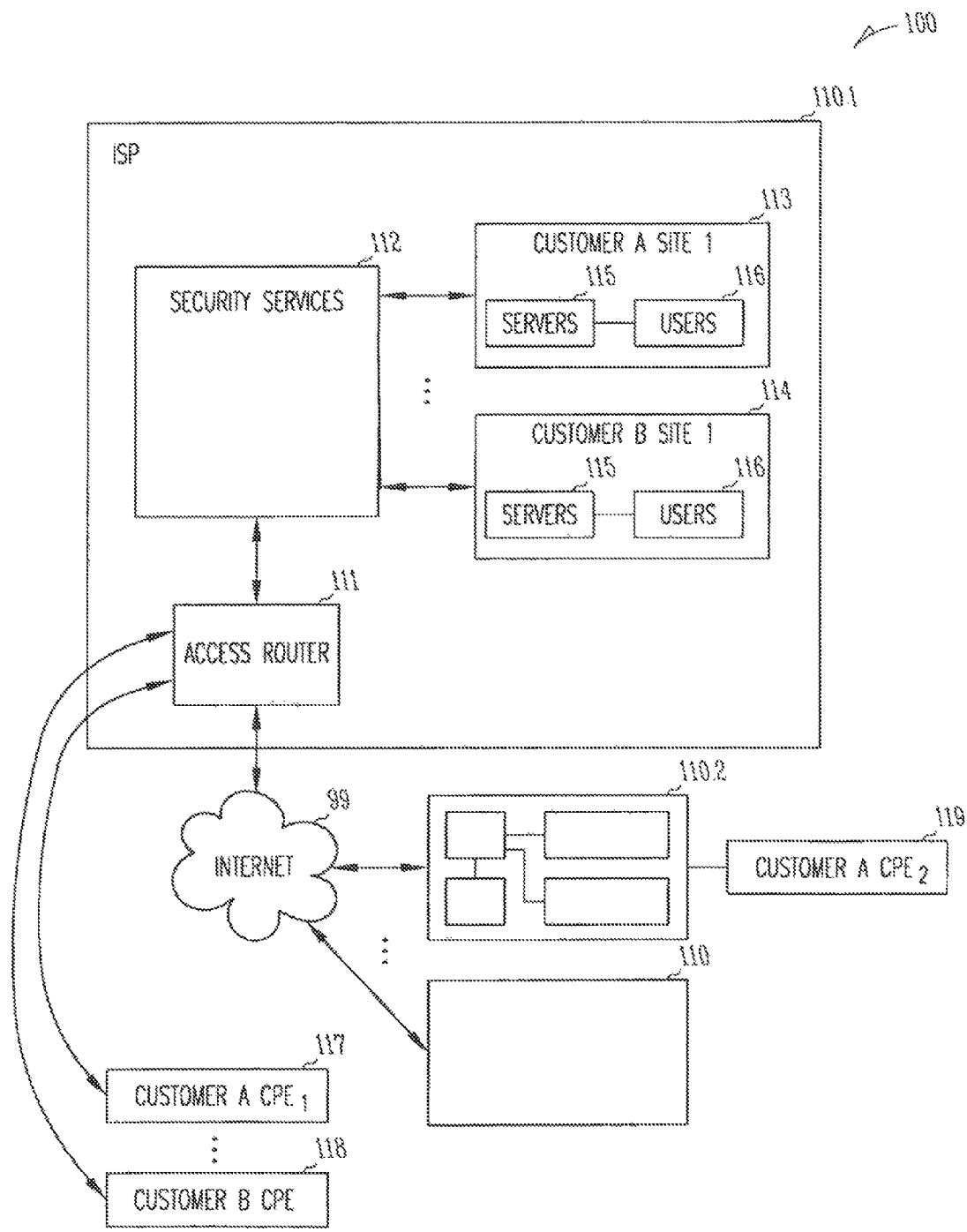
FIG. 1 is a block diagram of a system having a plurality of ISP boxes connected to the Internet in accordance with an embodiment of the present invention.

FIG. 1 shows a system 100 that includes a plurality of similar ISP (Internet service provider) boxes 110 connected to the Internet 99 in accordance with an embodiment of the present invention. In this embodiment, each box 110 represents a subsystem having routing services provided by a block called access router 111, and hosting services provided by blocks 113 and 114. The ISP is typically a company that provides Internet services (such as connectivity to the Internet, as well as servers that store data and provide data according to requests by users, and network connectivity to users) to a plurality of customers including customer A and customer B. In some embodiments, customer premises equipment 117 and 118 (also called CPE 117 and 118, this is hardware and the software that controls the hardware, that is installed at the customer's premises; this can include servers, routers and switches, and the network connecting to individual user's workstations, and various interfaces to external communications networks) is used to provide at least a portion of the function to support customers A and B respectively, and the ISP 110 provides the rest in blocks 113 and 114 respectively. The function to support customers includes such things as web site hosting, database and other servers, e-mail services, etc. The customer's CPE 117 and 118 connect to the ISP through, e.g., access router 111 and security services 112 to customer A site one 113 and customer B site one 114, and also to the Internet 99 in a manner that isolates customer A and customer B from one another except for communications and E-mail that would normally pass across the Internet 99.

Further, by establishing secure connections between two ISP boxes 110 across the Internet 99, a virtual private network or VPN 410 (see FIG. 4 below) can be created. This function allows, for example, customer A's office at a first site (e.g., headquarters 117) to connect seamlessly to customer A's office at a second site (e.g., branch office 119) using what appears to them as a private network, but which actually includes some CPE at site 117, some services 113 provided within ISP 110.1, a secure encrypted connection across Internet 99, some services also in ISP 110.2, and some CPE at site 119. Users at sites 117 and 119 can communicate with one another and share data and servers as if they were on a single private network provided by, e.g., VPN 410.

Figure 2:
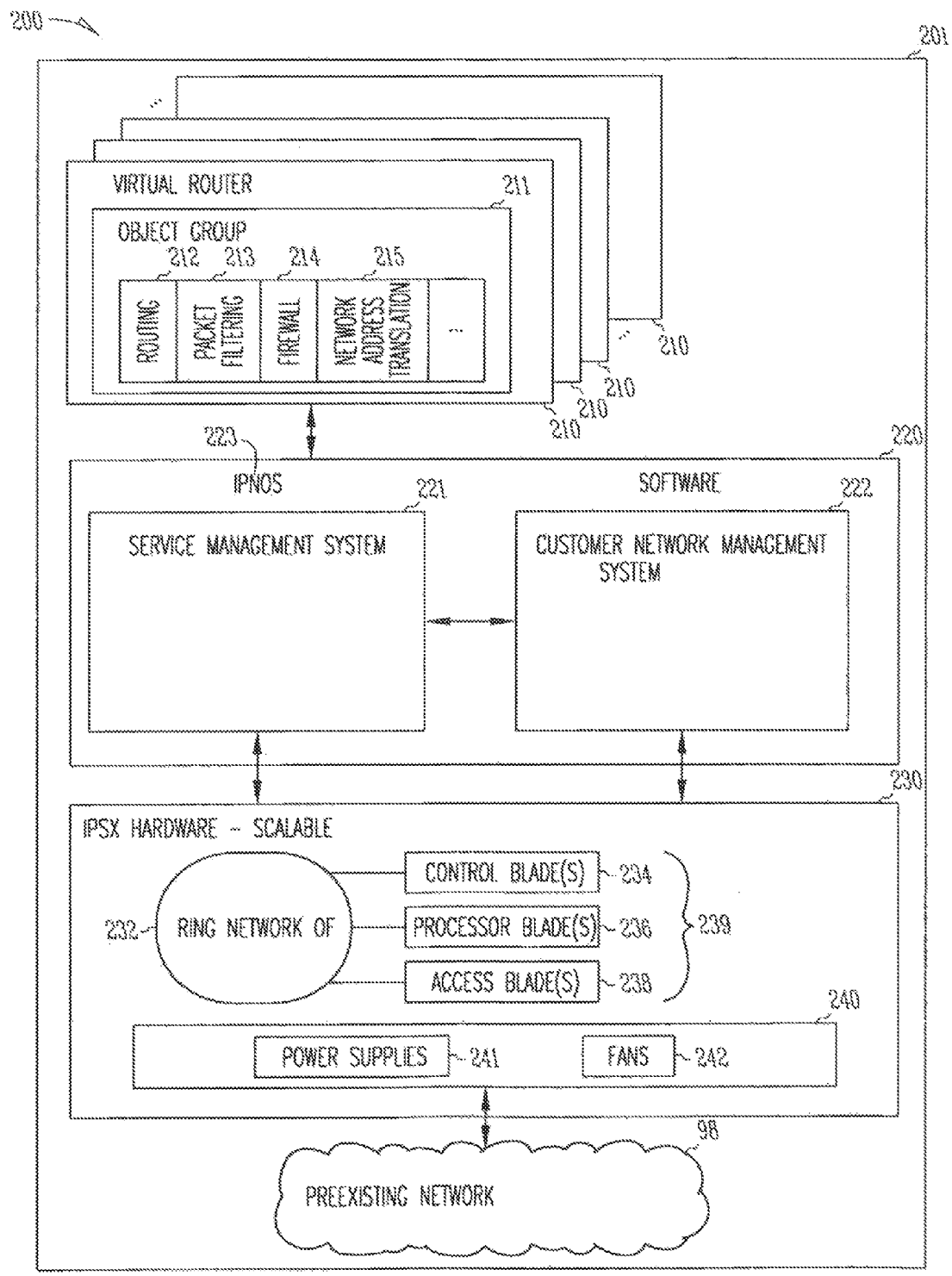
FIG. 2 is a block diagram a service provider network in accordance with an embodiment of the present invention.

FIG. 2 is a block diagram of a service provider (SP) network 200 in accordance with an embodiment of the present invention. A conventional network "cloud" 98 includes the SP's Internet protocol (IP) or asynchronous transfer mode (ATM) core, as is well known in the Internet art. IP system 201 connects to such existing infrastructure 98, as well as to other optional conventional hardware such as described in FIG. 2 below, to provide SP network 200. IP System 201 provides hardware 230 and software 220 to provide a plurality of virtual routers (VRs) 210. Each VR 210 provides support for router services and server services such as those that provide customer site services 113 of FIG. 1. Each VR 210 is supported by an object group 211, which is a group of generally dissimilar objects such as routing object 212, packet filtering object 213, firewall object 212, network address translation (NAT) object 215, and/or other objects. In some embodiments, each VR 210 is a separate instantiation.

In some embodiments, software 220 includes IP network operating system (IPNOS) 223, service management system (SMS) 221 (e.g., in some embodiments, this is the Invision™ software from CoSine Communications Inc., assignee of the present invention), and customer network management system (CLAMS) 222 (e.g., in some embodiments, this is the Ingage™ software from CoSine Communications Inc., assignee of the present invention). SMS 221 provides such services as configuration of blades 239, defining subscribers, determining services, and generation of IP security (IPSec) public/private key pairs. CLAMS 222 provides such services as providing subscribers (customers) visibility to services. In some embodiments, CLAMS software runs at least in part in a user's CPE or workstation, typically at a company's information services (IS) headquarters.

In some embodiments, IP server switch (IPSX) hardware 230 includes one or more scalable hardware enclosures, each having a plurality of service "blades" 239 (i.e., an insertable and removable printed circuit card having one or more processors, each having its own CPU and memory) each connected in a ring configuration (such as a counter-rotating dual ring 232). In some embodiments, three types of blades 239 are provided: control blade(s) 234, processor blade(s) 236, and access blade(s) 238. IPSX hardware also includes highly available, redundant, and hot-swappable hardware support 240 including power supplies 241 and fans 242.

Figure 3:
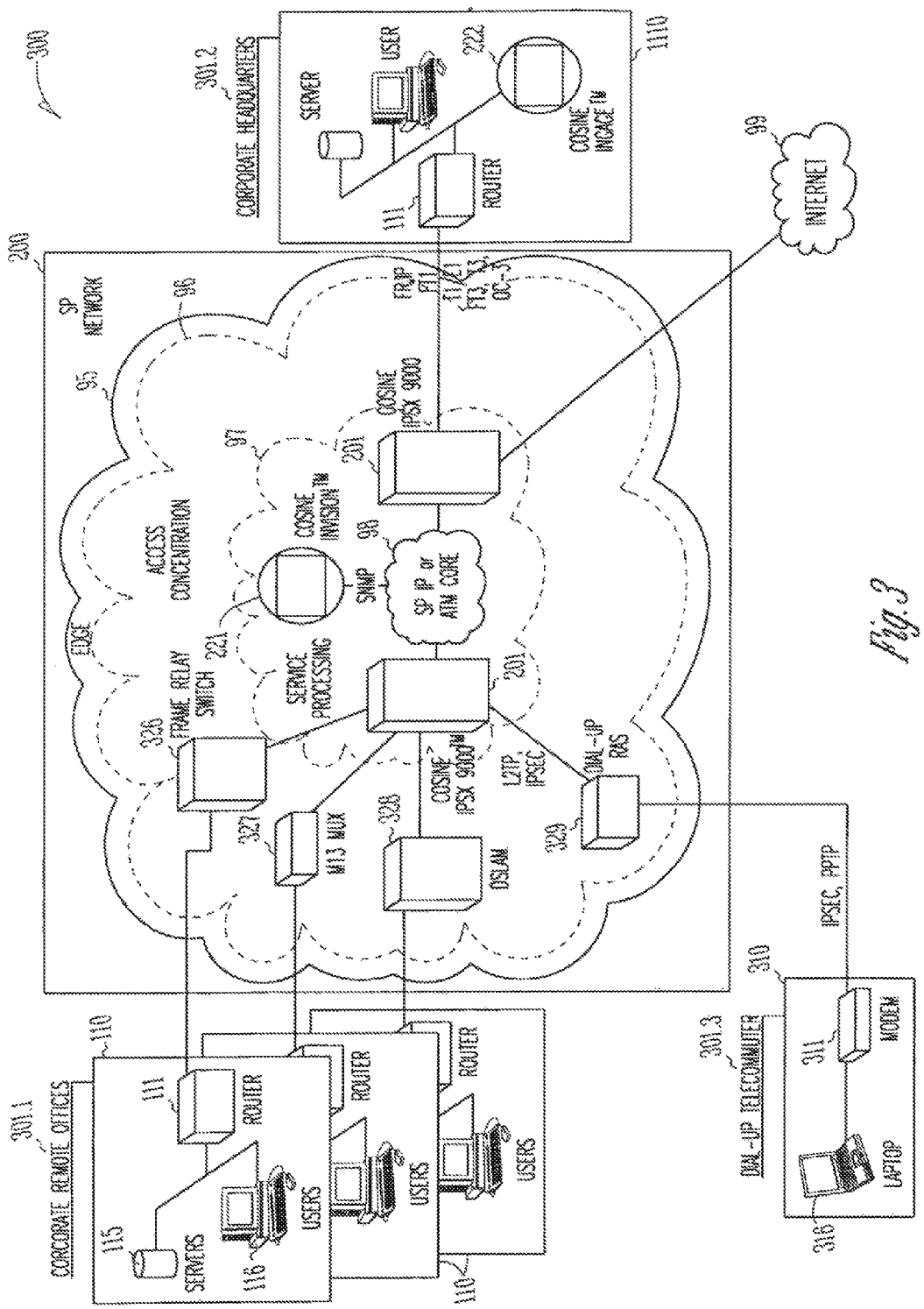
FIG. 3 is a block diagram of an IP service delivery platform in accordance with an embodiment of the present invention.

FIG. 3 is a block diagram of an IP service delivery platform (IPSDP) 300 in accordance with an embodiment of the present invention. The hardware and software of SP network 200 can be viewed as generating various network "clouds" such as edge cloud 95, access concentration cloud 96, and service processing cloud 97. These are built upon the existing conventional SP's IP or ATM core cloud 98 and they connect to the external Internet cloud 99. IPSDP 300 includes an ISP's SP network 200 connected to one or more customer's offices 301 each of which includes some amount of CPE 110. In the embodiment shown, three corporate remote offices 301.1 are connected to SP network 200 using various conventional communications devices, well known to the art, such as frame relay switch 326, M13 multiplexor (mux) 327, DSLAM (digital subscriber link access multiplexor) 328, and dial-up RAS (remote access server) 329 (used to receive dial-up connections, for example, from the modem 311 connected to laptop computer 316 in portable system 310 of dial-up telecommuter 301.3). In the embodiment shown, SP network 200 includes two systems 201, on connecting through frame relay switch 326, M13 multiplexor (mux) 327, DSLAM 328, and dial-up RAS 329 to remote office's CPE 110, and the other connecting directly to the customer's corporate headquarter's CPE 1110 (which also includes a control and monitoring function provided by CNMS 222) using conventional communications protocols such as frame relay (FR, an access standard defined by the ITU-T in the 1.122 recommendation "Framework for Providing Additional Packet Mode Bearer Services"), Internet protocol (IP), FT1 (fractional T1), T1/E1 (a digital transmission link with capacity of 1.544 Megabits per second), FT3 (fractional T3), T3 (capacity of 28 T1 lines), and/or OC3 (optical carrier level 3=three times the OC1 rate of 51.840 Mbps)(each of which is a conventional communications service well known to the art).

In some embodiments, IPDSP 300 provides a VPN 410, using secure connections across the Internet 99, to connect remote offices 301 to one another.

Figure 4:
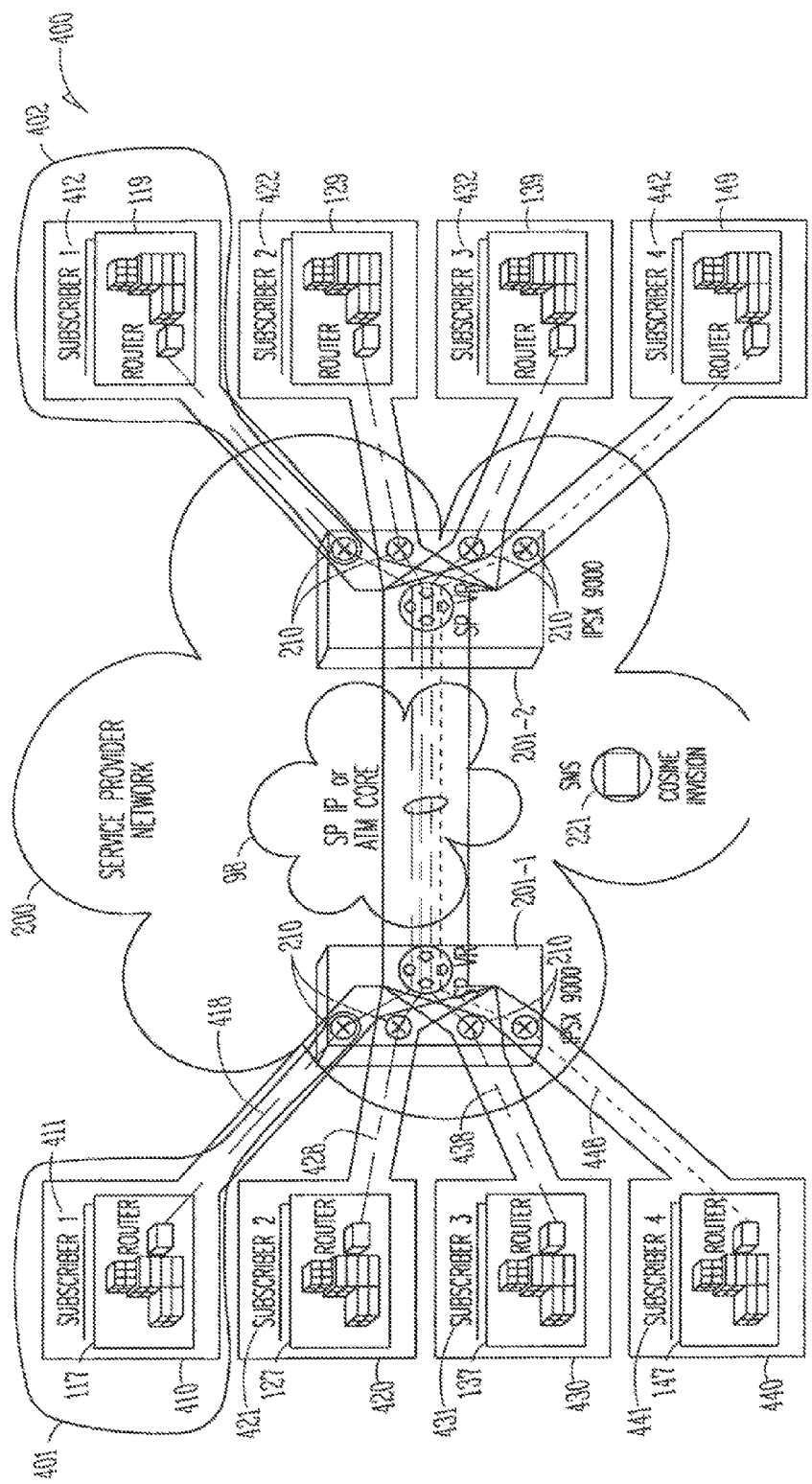
FIG. 4 is a block diagram of a system providing a plurality of virtual private networks in accordance with an embodiment of the present invention.

FIG. 4 is a block diagram of a system 400 providing a plurality of virtual private networks 410, 420, 430, 440 in accordance with an embodiment of the present invention. VPNs 420, 430, and 440 are each equivalent to the VPN 410 that supports subscriber 1, except that they are for other subscribers. Each subscriber has a set of partitioned virtual routers 210. For example, subscriber 1 has two locations, 411 and 412, connected in a VPN 410. VR 210 at location 411 can include some CPE 110 as well as support provided in system 201-1. VR 210 at location 412 can include some CPE 110 as well as support provided in system 201-2. These two VRs 210 establish a "tunnel," a secure connection, that allows them to maintain secure communications that support the VPN 410 even across packet networks such as the Internet 99. Each VR 210 is the equivalent of an independent hardware router. Since each VR 410 is supported by an object group 211, objects can be easily added or omitted to enable customized services on a subscriber-by-subscriber basis to meet each subscriber's individual needs. SMS 221 running on SP network 200 allows ease of service provisioning (dynamically adding additional processors/processing power when needed, reducing the processors/processing power used for VPN 410 when not needed). In some embodiments, IPNOS 223 uses an open Application Program Interface (API) to enable new services to be added to the platform whenever needed.

In some embodiments, system 401 at a first site (e.g., an ISP premises locally connected to a customer office) includes IPSX 201-1 having a VR 210 connected to CPE 117. This system 401 appears to the outside world as a single router having firewall services, server(s) and user(s), etc. These functions can be provided by either or both VR 210 and CPE 117, thus allowing a customer to outsource many or most of these services to the service provider and IPSX 201-1. Similarly, system 402 at a second site (e.g., another ISP premises locally connected to a remote office of the same customer) includes IPSX 201-2 having a VR 210 connected to CPE 119. This system 402 also appears to the outside world as a single router having firewall services, server(s) and user(s), etc. These functions can be provided by either or both VR 210 and CPE 119, thus allowing a customer to outsource many or most of these services to the service provider and IPSX 201-2.

Figure 5:
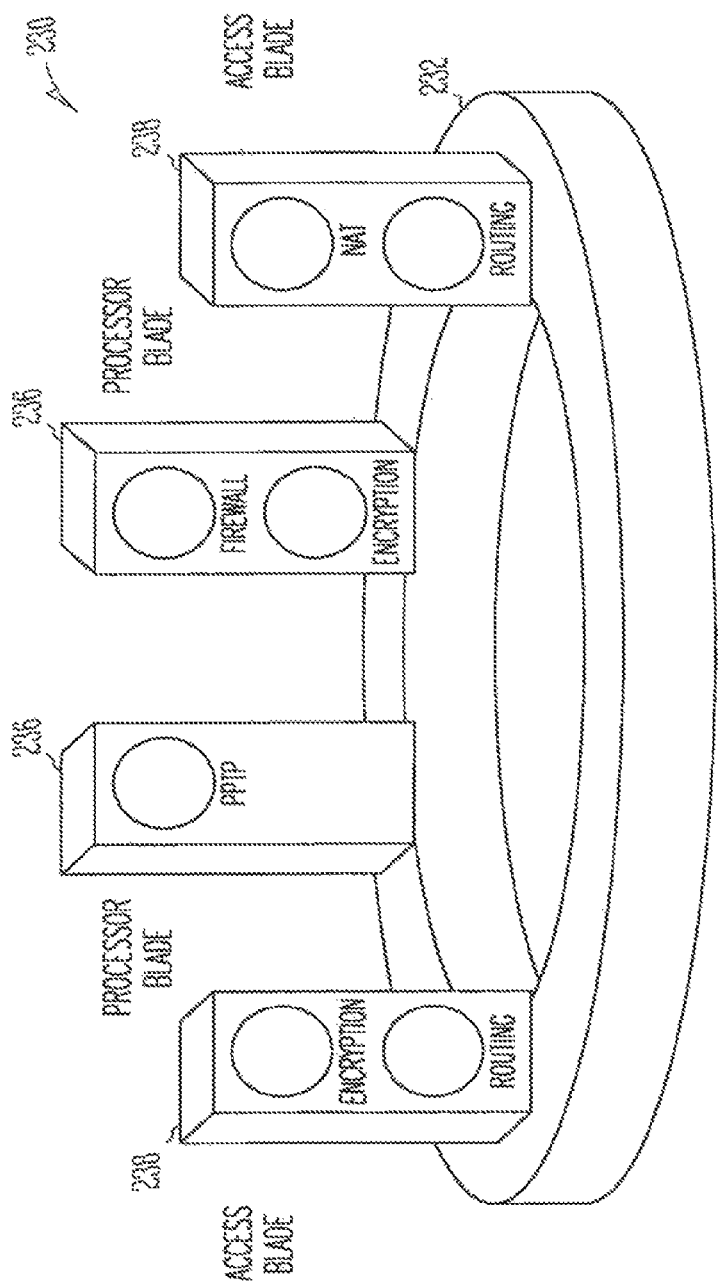
FIG. 5 is a block diagram of a ring-network hardware platform in accordance with an embodiment of the present invention.

FIG. 5 is a block diagram of a ring-network hardware platform 230 in accordance with an embodiment of the present invention. Hardware platform 230 includes plurality of service "blades" 239 (i.e., an insertable and removable printed circuit card having one or more processors, each having its own CPU and memory) each connected in a ring configuration (such as a counter-rotating dual ring 232). In some embodiments, three types of blades 239 are provided: control blade 234 (not shown here), processor blades 236 (providing such functions as point-to-point (PPTP) connectivity, firewall protection against hacking, intruders, or accidental access), and access blades 238 (providing such functions as NAT, encryption, and routing).

Figure 6:
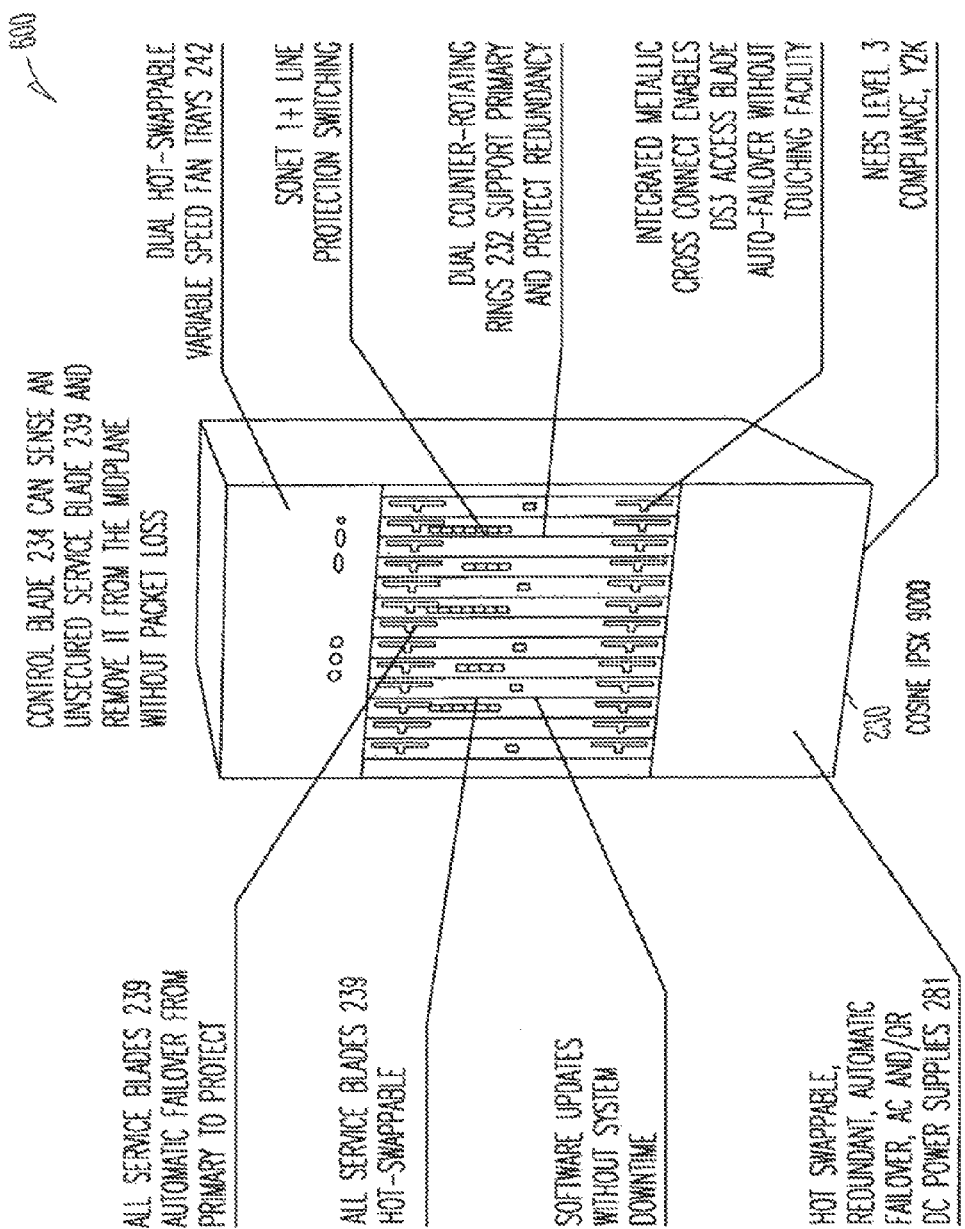
FIG. 6 is a block diagram of a service processing switch in accordance with an embodiment of the present invention.

FIG. 6 is a block diagram of a service processing switch 600 in accordance with an embodiment of the present invention. In some embodiments, service processing switch 600 includes a hardware enclosure 230 having power supplies 241 that are hot-swappable, redundant, capable of automatic failover (when one fails, others take over), and which can be AC or DC sourced. In some embodiments, dual hot-swappable, variable speed fans 242 are provided. In some embodiments, software updates can be made without system downtime by swapping out all object groups 211 (virtual routers), changing the software modules, and then resuming processing. In some embodiments, all service blades 239 are hot-swappable (they can be removed and/or inserted without bringing the system down) and include automatic failover from primary mode to protect mode. In some embodiments, dual counter-rotating rings 232 support primary and protect redundancy. In some embodiments, system 600 provides NEBS Level 3 compliance and is Y2K ready, provides SONET (synchronous optical network) 1+1 Line Protection Switching, and includes integrated metallic cross-connects to enable DS3 (digital signal level 3; 44,736, 000 bits per second) blade automatic failover without touching the facility.

Figure 7:
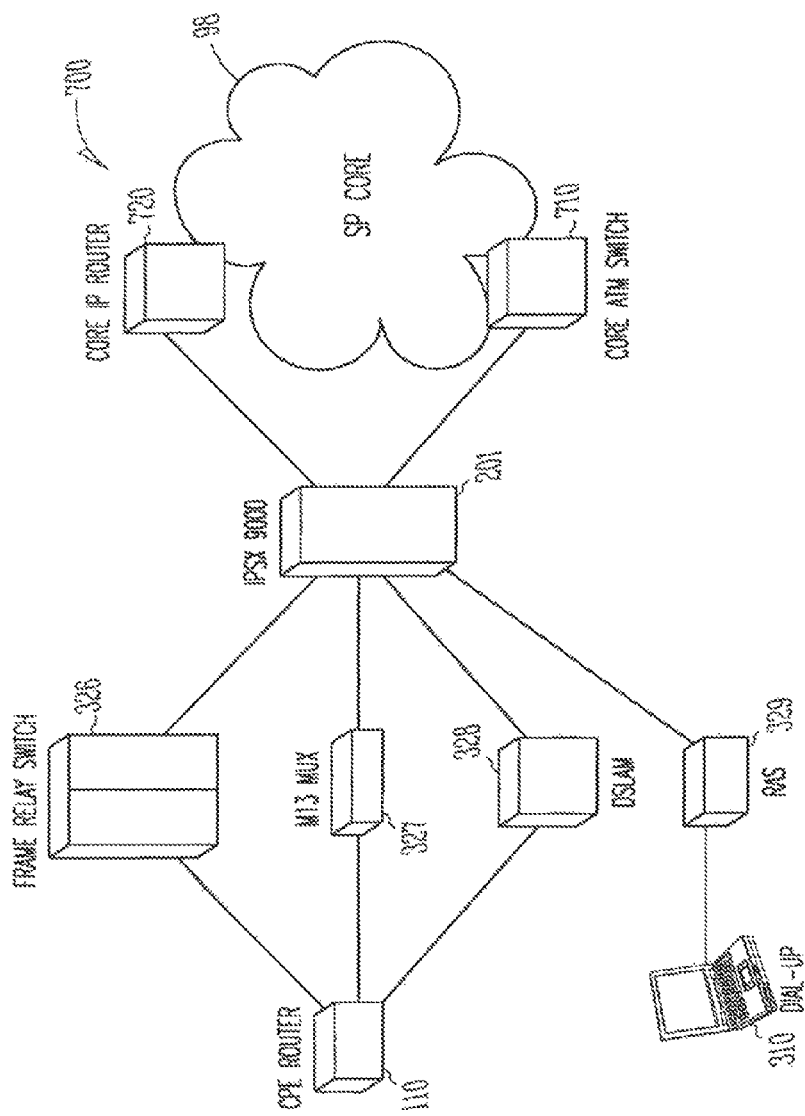
FIG. 7 is a block diagram of an integrated system including conventional existing network elements in accordance with an embodiment of the present invention.

FIG. 7 is a block diagram of an integrated system 700 including conventional existing network elements in accordance with an embodiment of the present invention. Integrated system 700 optionally includes conventional frame relay switch 326, M13 mux 327, Digital Subscriber link Access Multiplexor (DSLAM) 328, and Remote Access Server (RAS) 329 connecting to customer's equipment such as CPE router 110 and dial-up system 310. In some embodiments, integrated system 700 optionally includes a core IP router 720 and/or a core ATM switch as part of an SP core 98. This provides support for a large number of conventional technology standards, and interoperability with existing access-concentration and core-network elements. It also offers interworking between frame-relay networks and IP networks. Network address translation (NAT) enables enterprise subscribers to leave their network addressing untouched. It also enables one to merge IP and legacy networks into one, with continuity of service (COS) guarantees.

FIG. 8 is a block diagram of hardware elements 230 and software elements 220 in accordance with an embodiment of the present invention. Hardware elements 230 include a 26-slot, two-sided chassis 831 having a 22-gigabit per second (Gbps) ring midplane 832. Service blades 239 can be hot plugged into midplane 832 form either side of chassis 831. Three types of service blades 239 are provided: control blades 234, processor blades 236, and access blades 238. In some embodiments, four processors are provided on each service blade 239, each processor having a CPU and its own memory, allowing specialized processing to be performed on various different daughter cards of the blades 239.

In some embodiments, a single system chassis 831 provides a redundant back plane and blade-termination facilities 832. The access blades 238, processor blades 236, control blades 234, power supplies 241 and fan trays 242 are designed for hot-swappable operation—any of these components may be removed from service while the entire system remains operational. The metallic cross connect is a passive system that provides fail-over support to allow DS3 and DS1 access facilities to be switched from one access blade to another access blade should an access port or card fail. The phase 1 chassis provides 26 universal slots, each of which may be populated with control blades, access blades, and processor blades. To operate, the chassis must contain at least one control blade. Up to two control blades may be operational in a chassis at the same time. Access blades are added as input/output requirements grow, and processor blades are added as computation requirements scale.

In some embodiments, each system 230 supports up to twenty-five processing blades (PB) 236. Each processor blade 236 is designed to support three hundred Mbps of full duplex traffic while delivering IP services including application firewall, LT2P, PPTP, NAT, VPN router.

In some embodiments, each system 230 supports up to two control blades (CB) 234. CBs 234 provide overall system supervision, IP route calculation, software update management, and network management statistics logging services. When two CBs 234 are operational within a chassis 831, they remain synchronized such that should either CB 234 fail, the other CB 234 automatically takes over system operation. In this process all active services remain in progress. Each control blade 234 is hot swappable, so that when proper procedures are followed, a failed or malfunctioning CB 234 may be removed from on operational system 230 without bringing down any customer services.

In some embodiments, each CB 234 provides four Ethernet interfaces for management traffic. Each Ethernet interface has a distinct collision domain and may each be configured with a primary and secondary IP address. Ethernet interfaces designated for management use may be configured for primary and protected configurations, both sharing the same IP address, reducing ISP IP address requirements. The CB 234 Ethernet interfaces may be configured for fully meshed communications over diverse paths to diverse operating systems. Each CB 234 is also equipped with a random # seed generator for use in security applications.

In some embodiments, each system 230 supports up to twenty-five access blades (AB) 238. Access blades 238 provide physical line termination, hardware-assisted IP forwarding, hardware assisted encryption services, and hardware assisted queue management. Each access blade 238 is hot swappable, so that when proper procedures are followed, a failed or malfunctioning access blade may be removed from on operational system 230 without bringing down any customer services. In some embodiments, 10/100 Ethernet-, DS3-, and OC3-type access blades are supported by system 230.

Figure 9:
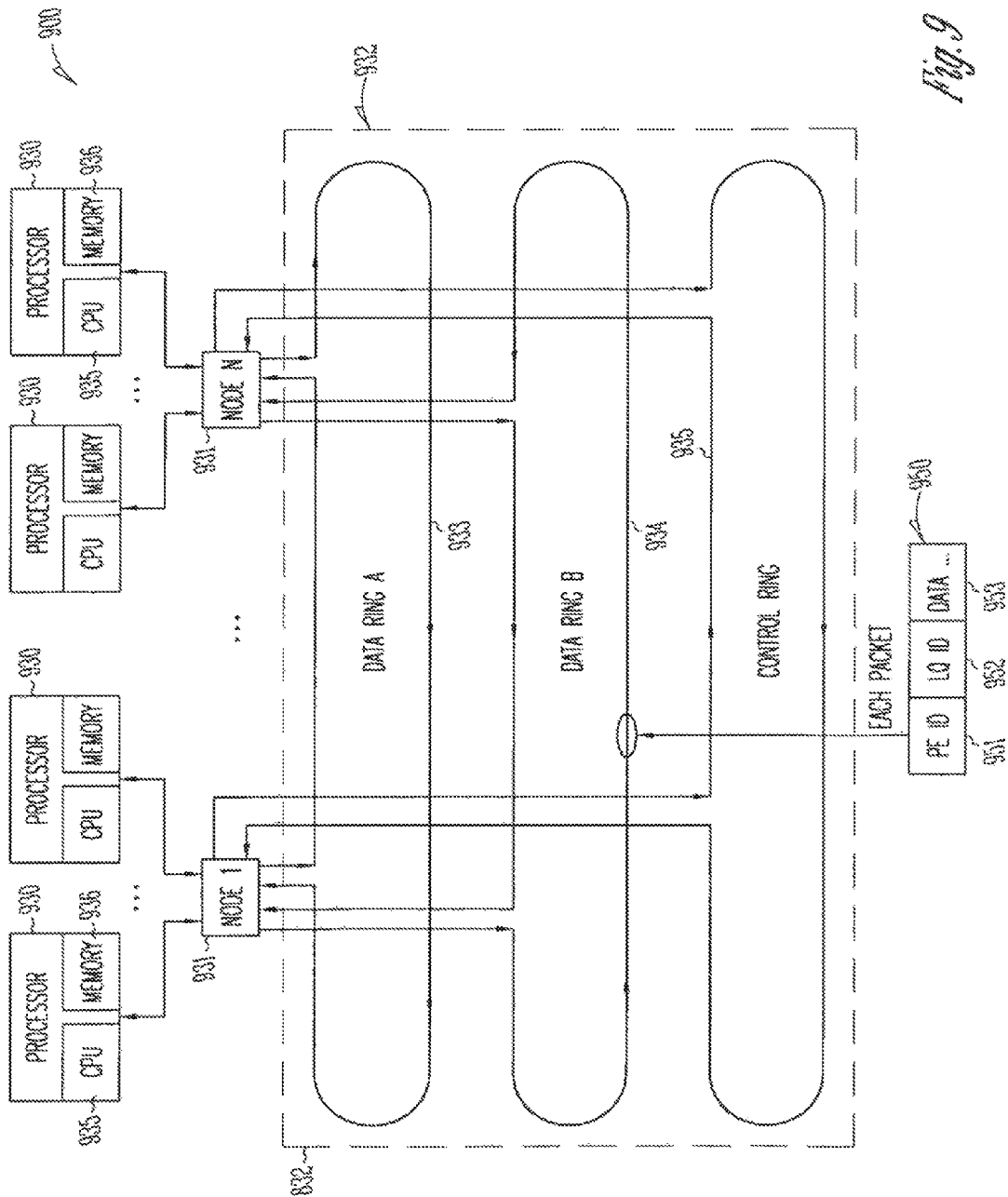
FIG. 9 is a block diagram of a multiprocessor system using a ring network in accordance with an embodiment of the present invention.

FIG. 9 is a block diagram of a multiprocessor system 900 using ring network 932 in accordance with an embodiment of the present invention. In some embodiments, each of two network rings 933 and 934 connect nodes 931 together, where each blade 239 includes one or more nodes 931, and each node 931 is connected to one or more processors 930. In some embodiments, each processor is a high-performance processor such as an R12K processor from MIPS Corporation. In one embodiment, each blade 239 includes four nodes 931, each having one processor 930. Each processor 930 includes its own CPU (central processing unit) 935 and memory 936, and optionally includes other hardware such as routers, encryption hardware, etc. Software tasks, in some embodiments, are split up such that one processor operates on one part of the data (e.g., the Level 7 processing) and another processor operates on another part of the data (e.g., the Level 3 processing). In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput. In some embodiments, the plurality of processors 930 in the ring configuration includes forming dual counter rotating ring connections 933 and 934, each connecting to each of the plurality of processors 930.

In some embodiments, a separate control ring 935 is provided, connected to all processors 930. Data passed on the control ring 935 allows control communications to be passed between processors, and in particular, allows the control blade to configure and control the other blades in IPSX 201. In other embodiments, control ring 935 is omitted, and its function is overlaid on rings 933 and 934.

Logical Queue Identifiers

In some embodiments, rings 933 and 934 are packet-passing rings. Each packet 950 placed in the rings includes a data portion 953 and a processor element identifier (PEID 951) that identifies for each node 931 which processor that packet is destined for, for example a 16-bit PEID that specifies one of 65526 PEs. If the PEID matches a processor on its particular node, the node 931 passes the packet to the proper processor 930; if not, the packet is forwarded to the next node 931. In some embodiments, each packet also includes a logical queue identifier (LQID) that identifies a software entity (for example, an object group for a particular VR 210) residing on that processor 930 for which the packet is destined.

In some embodiments, every node 931 has a unique, globally unique (i.e., unique within an IPSX 201, or within an ISP having a plurality of IPSXs 201) PEID 951. In some embodiments, the way this is done is that one takes the blade ID (e.g., five bits) and you append the PE number, which is, for example, a eleven bits. Put that together in some fashion and you'll get a unique ID that is globally unique within some hardware configuration. Note that packets including this PEID 951 are routable. Just by looking at the PEID 951, the system 201 has a topological structure so that it can route based on purely the PEID 951. The next thing to keep in mind is that system 201 is managing multiple virtual context. Each VR 210 in a system 201 is a virtual router to which packet are to be directed. When packets come into node N 931 for example, system 201 needs to be able to steer it to the appropriate logical entity, i.e., to the appropriate context and to the object channel that it represents. Thus, a logical queue ID 952 is appended that is unique within the destination processor (PE) 930. If an object in a processor 930 on node 1 930 wants to set up a channel to another object a processor 930 on node N 930, they need to use the LQID 952. A first LQID 952 and PEID 951 together represent the local end, and a second LQID 952 and PEID 951 together represent the remote end of the object and so the system can map the corresponding object channel, defining the object channel that is going across the network. From a networking perspective, PEID 951 looks like your IP address that routes packets like an IP address. But once you go to a particular node 931, the LQID looks like the UDP (User Datagram Protocol, a TCP/IP protocol describing how messages reach programs within a destination computer) code number. So system 201 (e.g., SMS 221) essentially signals and negotiates the proper LQID to have a channel going between those ends. This allows all the traffic coming into a PE 930 to be steered along the appropriate object path to the appropriate object channel on that object.

In some embodiments, an object could be talking on another channel to another object, or to the same object, using a different channel. In which case each channel uses a different LQID 952, but the same PEID 951.

In some embodiments, system 201 sets up a shortcut that circumvents traffic that otherwise would be transmitted outside system 201 and then back in (e.g., traffic between two different VRs 210 supporting different customers). To set up such a shortcut, system 201 allocates a different LQID 952 for the shortcut. Thus, an object channel has the normal point-to-point path for normal traffic and has a multi-point-to-point path, which is used for shortcut traffic. So when packets come in to the object it knows whether the packet came in on the normal path or on the shortcut path. Similarly, when the object wants to use a shortcut, it also needs to allocate a different LQID for its outbound shortcut traffic. One interesting distinction of shortcut paths is that the normal point-to-point is bidirectional and data can flow in both directions, but shortcuts data flow flows in only one direction. So a receive site can have any number of transferred sites. Any number of objects can be transmitting to the same receive site. That is why it is called multi-point-to-point.

Further, some embodiments have different levels of shortcuts. For example, a packet can be sequentially passed to successive destinations in some embodiments. Thus there can be a complex multistage path. The shortcuts can trickle down to the ultimate end, where the packet cascades. Further, if one object knows a shortcut, it can tell other objects about its shortcut. So the other object does not have to come to the first object and then be directed to the shortcut destination, but rather can directly use the shortcut it has learned about.

While service providers recognize the tremendous revenue potential of managed firewall services, the cost of deploying, managing and maintaining such services via traditional CPE-based methods is somewhat daunting. Service providers are now seeking new service delivery mechanisms that minimize capital and operational costs while enabling high-margin, value-added public network services that are easily provisioned, managed, and repeated. Rolling out a network-based managed firewall service is a promising means by which to accomplish this. Deploying an IP Service Delivery Platform in the service provider network brings the intelligence of a managed firewall service out of the customer premises and into the service provider's realm of control.

An IP Service Delivery Platform consists of three distinct components. The first is an intelligent, highly scalable IP Service Processing Switch. Next is a comprehensive Service Management System (SMS) to enable rapid service provisioning and centralized system management. The last component is a powerful Customer Network Management (CNM) system which provides enterprise customers with detailed network and service performance systems, enable self-provisioning, and eases IT managers fears of losing control of managed network services.

In a network-based managed firewall service model, the service provider replaces the high-capacity access concentration router at the POP with an IP Service Processing Switch. This is higher-capacity, more robust, and more intelligent access switch, with scalable processing up to 100+ RISC CPUs. Just as with the access router, additional customer access capacity is added via installing additional port access blades to the IP Service Processing Switch chassis. Unlike conventional access routers, however, additional processor blades are added to ensure wire-speed performance and service processing.

The intelligence resident in the IP Service Processing Switch eliminates the need to deploy CPE devices at each protected customer site. Deployment, configuration, and management of the managed firewall service all take place between the IP Service Processing Switch 230 and its Service Management System 221, which resides on a high-end UNIX platform at the service provider NOC. The customer also has the ability to initiate service provisioning and augmentation via a web-based Customer Network Management tool that typically resides at the customer's headquarters site. This is an entirely different service delivery paradigm, requiring minimal or no truck rolls or on-site intervention.

To roll out a managed network-based firewall service, the service provider's security staff provides a consultation to the enterprise, thereby gaining an understanding of the corporate network infrastructure and developing appropriate security policies (this is a similar process to the CPE model). Once this has been accomplished, the NOC security staff remotely accesses the IP Service Processing Switch (using the Service Management System 221) at the regional POP serving the enterprise customer, and the firewall service is provisioned and configured remotely.

This model enables the service provider to leverage the enterprise's existing services infrastructure (leased lines and Frame Relay PVCs) to deliver new, value-added services without the requirement of a truck roll. All firewall and VPN functionality resides on the IP Service Processing Switch at the POP, thus freeing the service provider from onsite systems integration and configuration and effectively hiding the technology from the enterprise customer. Firewall inspection and access control functions, as well as VPN tunneling and encryption, take place at the IP Service Processing Switch and across the WAN, while the enterprise's secure leased line or Frame Relay PVC (permanent virtual circuit) access link remains in place. The customer interface is between its router and the IP Service Processing Switch (acting as an access router), just as it was prior to the rollout of the managed firewall service. Additionally, the customer has visibility into and control over its segment of the network via the CNM that typically resides at the headquarters site.

TABLE 1

Comparison Between CPE-based and Network-based Managed Firewall Turn-up Processes

| Process | CPE-based Model | Network-based Model |
|---|---|---|
| Service Preparation | Security consultation to identify customer requirements/policies, CPE-device(s) ordered, CPE device(s) preconfigured, CPE device(s) shipped to customer site | Security consultation to identify customer requirements/policies |
| Service Rollout | Security technician deployed to site(s), OS/Firewall/VPN software loaded (server-based model), Physical network integration of device | Service provisioning and policy configuration deployed from NOC via Service Management System (SMS)-No truck roll needed. |
| Additional Service Deployment | Repeat above with each additional service | Add configurable template to SMS and duplicate across all service points, provision with CNM-No truck roll. |
| Maintenance/Support | Technician on phone with customer testing CPE and technician at POP testing equipment. Maintain inventory of spare units/components service region. Ship spares to customer site as needed. Deploy technician to customer site to complete repairs if necessary. | Order spares/replacement from central vendor repository-No truck roll necessary. Integrate replacement in unit component at POP. |

The network-based firewall model also enables service providers to quickly and cost-effectively roll out managed firewall solutions at all enterprise customer sites. As a result, secure Internet access can be provided to every site, eliminating the performance and complexity issues associated with backhauling Internet traffic across the WAN to and from a centralized secure access point.

As the IP Service Delivery Platform is designed to enable value-added public network services, it is a carrier-grade system that is more robust and higher-capacity than traditional access routers, and an order of magnitude more scalable and manageable than CPE-based systems. The platform's Service Management System enables managed firewall services, as well as a host of other managed network services, to be provisioned, configured, and managed with point-and-click simplicity, minimizing the need for expensive, highly skilled security professionals and significantly cutting service rollout lead-times. The Service Management System is capable of supporting a fleet of IP Service Processing Switches and tens of thousands of enterprise networks, and interfaces to the platform at the POP from the NOC via IP address. Support for incremental additional platforms and customers is added via modular software add-ons. Services can be provisioned via the SMS system's simple point and click menus, as well as requested directly by the customer via the CNM system.

Deployment of a robust IP Service Delivery Platform in the carrier network enables service providers to rapidly turn-up high value, managed network-based services at a fraction of the capital and operational costs of CPE-based solutions. This enables service providers to gain a least-cost service delivery and support structure. Additionally, it enables them to gain higher margins and more market share than competitors utilizing traditional service delivery mechanisms—even while offering managed firewall services at a lower customer price point.

The following embodiments explore four specific managed firewall service delivery architectures usable by service providers, systems integrators, and hardware/software vendors.

CPE-Based Models

Architecture One: Check Point/Nokia Appliance

This architecture employs a firewall/VPN CPE appliance, traditional access router, and software-based centralized management system to deliver a managed firewall solution. The specific components of this solution include:
1. CheckPoint/Nokia VPN-1/IP-330 appliance (50 user license) at branch sites
2. CheckPoint VPN-1/Firewall-1 software module (unlimited user license) on Sun Enterprise Ultra 250 server platform at headquarters
3. Cisco 7513 access router at the service provider's POP (redundant power, redundant RSP4)
4. CheckPoint Provider-1 management system at the service provider's NOC (supports 50 customers/module) with unlimited sites/customer on Sun Ultra 60 platform at Network Operations Center (NOC)

Figure 10:
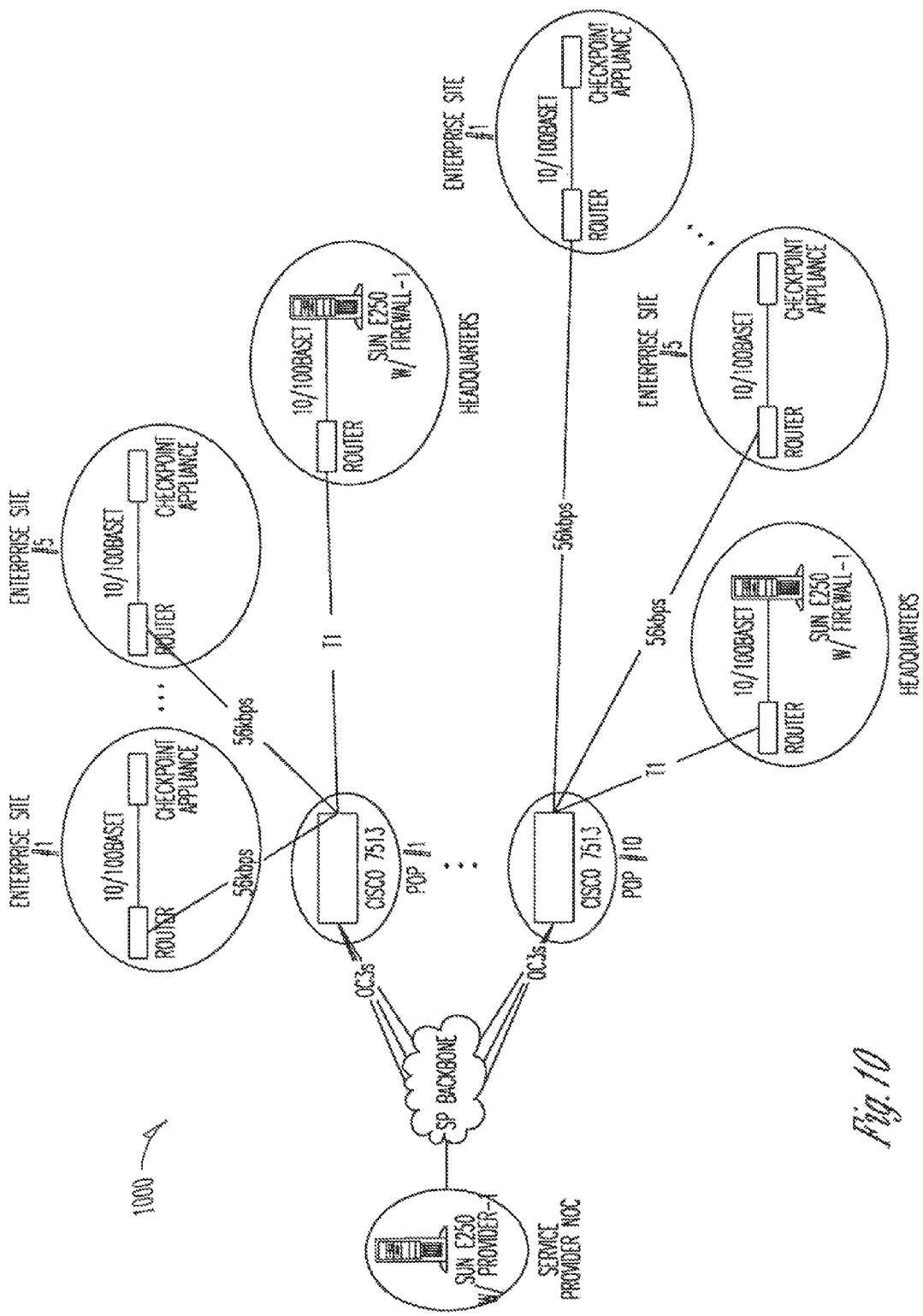
FIG. 10 shows a block diagram of a system for comparison.

FIG. 10 shows a block diagram of a system 1000 providing a Managed Firewall Service with a CheckPoint/Nokia Appliance Solution.

Architecture Two: CheckPoint Server

Figure 11:
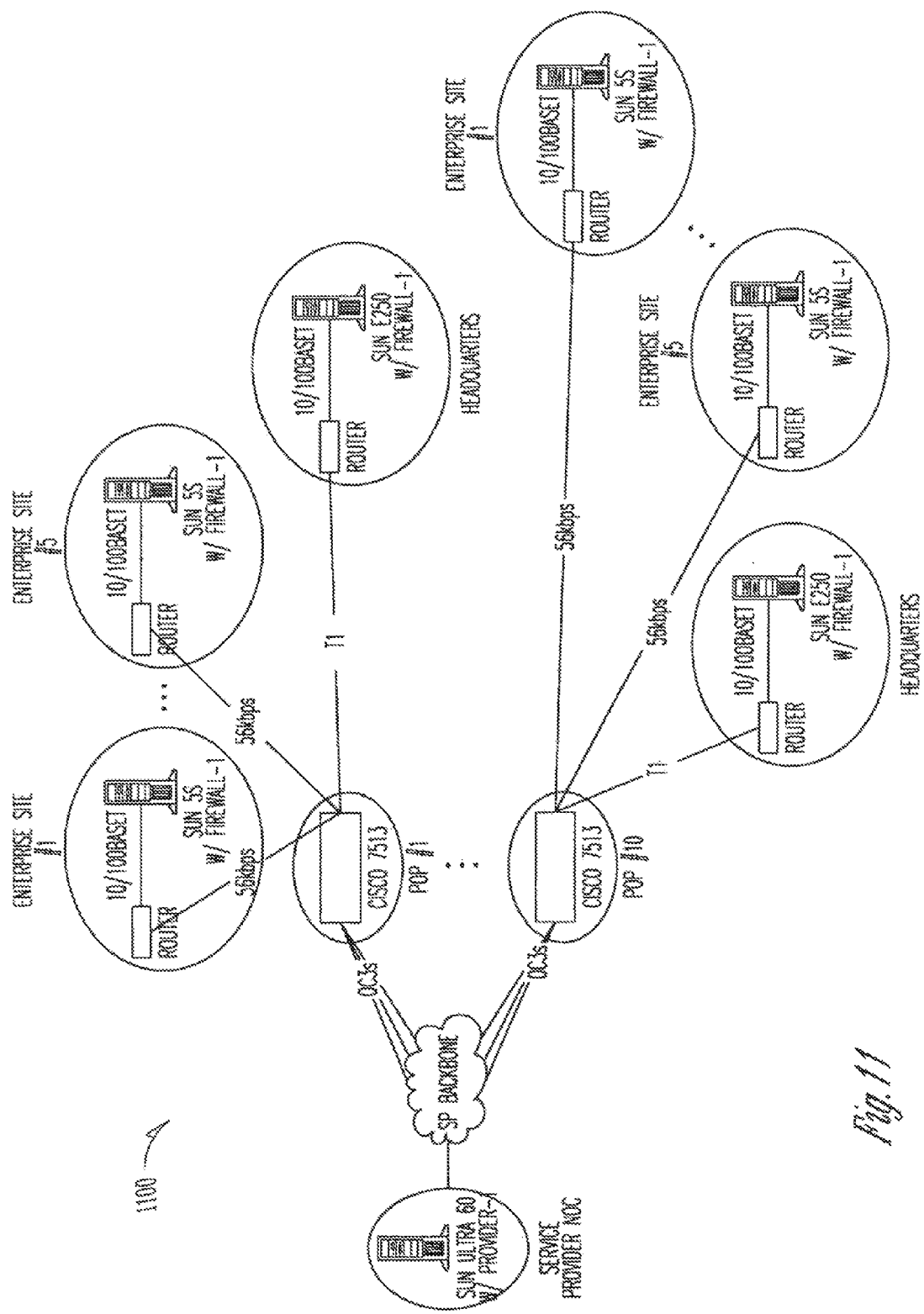
FIG. 11 shows a block diagram of a system for comparison.

This architecture employs a firewall/VPN CPE server, traditional access router, and software-based centralized management system to deliver a managed firewall solution. The specific components of this solution include:
1. CheckPoint VPN-1/Firewall-1 software module (50 user license) on Sun 5S server platform at branch sites 2. CheckPoint VPN-1/Firewall-1 software module (unlimited user license) on Sun Enterprise Ultra 250 server platform at headquarters
3. Cisco 7513 access router at the service provider POP (redundant power, redundant RSP4)
4. CheckPoint Provider-1 management system (supports 50 customers/module) with unlimited sites/customer on Sun Ultra 60 platform at NOC FIG. 11 shows a block diagram of a system 1100, providing a Managed Firewall Service with a CheckPoint Firewall-1 Server-based Solution.

Architecture Three: WatchGuard Appliance Model

Figure 12:
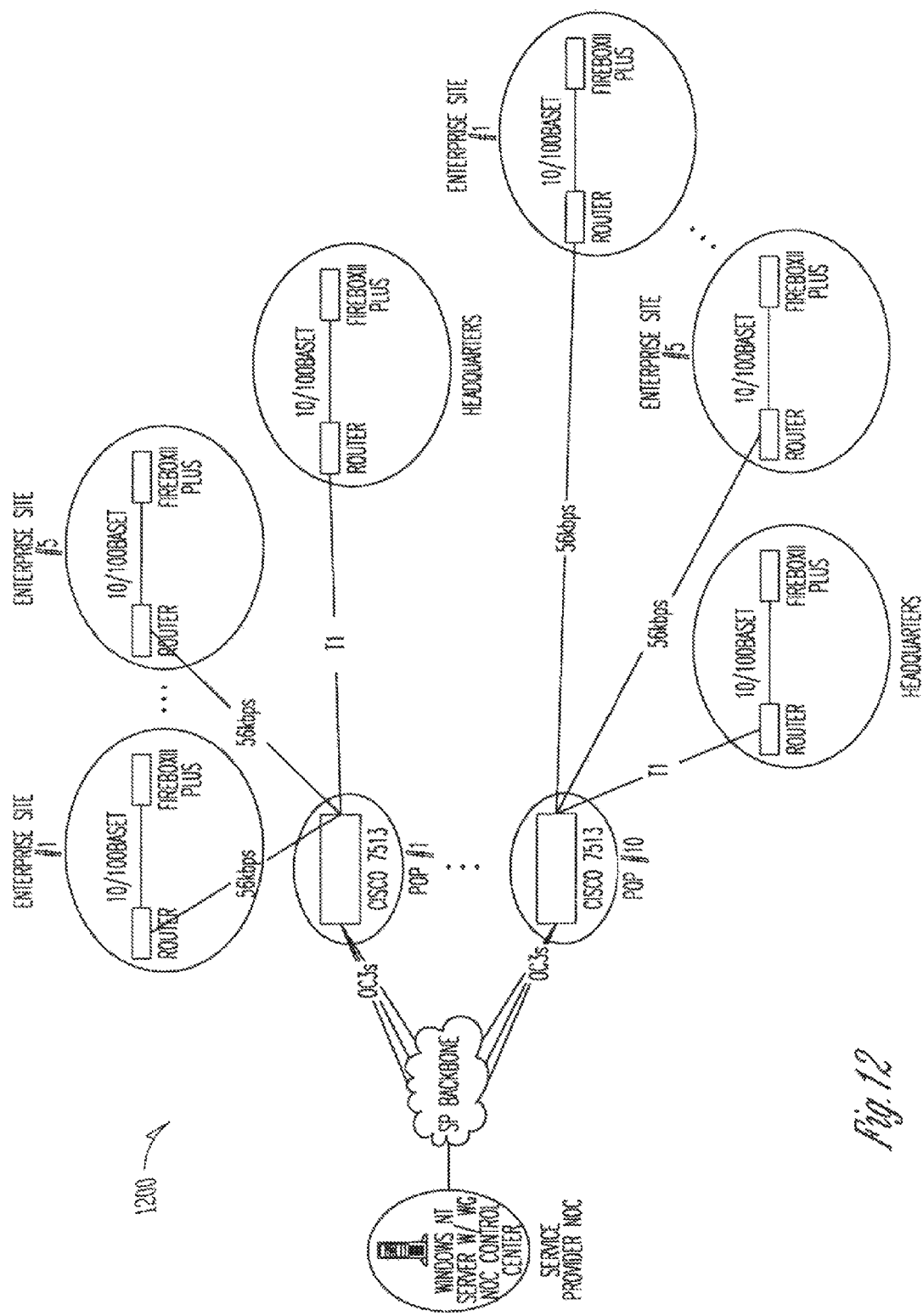
FIG. 12 shows a block diagram of a system for comparison.

This architecture employs a firewall/VPN CPE appliance, traditional access router, and software-based centralized management system to deliver a managed firewall solution. The specific components of this solution include:
1. WatchGuard Firebox II Plus appliance at branch sites
2. Cisco 7513 access router at the service provider POP (redundant power, redundant RSP4)
3. WatchGuard for MSS management system (supports 500 customers/module) with unlimited sites/customer on Compaq Proliant 3000 Windows NT workstation platform, Event Processor on Sun Microsystems 5S server platform FIG. 12 shows a block diagram of a system 1200, providing a Managed Firewall Service with a WatchGuard Appliance Solution. The CPE-based managed firewall service model requires installation and configuration of system components at three network points: the service provider POP, the service provider NOC, and the customer premises.

POP Infrastructure

Each of the three CPE-based architectures explored in this analysis employs an identical POP infrastructure. This access infrastructure is based on the Cisco 7513 router. The base configuration for the 7513 includes:
1. 13-slot chassis
2. IOS Service Provider system software
3. (2) power supplies
4. (2) Route Switch Processors (RSP4)
5. (2) RSP4 128 MB DRAM Option
6. (2) RSP4 20 MB Flash Card Option
7. 2-port Fast Ethernet Card
8. 64 MB DRAM Option
9. 8 MB SRAM Option The RSP4 cards in this base configuration each consume one slot in the chassis, leaving 11 remaining for port adapters. An Ethernet card is added for software uploads. Ingress traffic is supported via dual-port channelized and/or dual-port unchannelized T3 cards (for dedicated T3 connections). Each channelized T3 port can support up to 128 DS0 or N.times.T1 channels Single-port OC-3 POS cards provide connectivity to the network uplink on the egress side. These cards each occupy a single slot. Each card requires a programmable Versatile Interface Processor (VIP2), as well as an additional 64 MB of DRAM and 8 MB of SRAM. The VIP2 and additional memory reside on the T3/OC-3 cards and do not consume additional slots.

As described in the assumptions, a traditional multiplexer exists at each POP to aggregate various sub-T1 customer access links up to the channelized T3 interfaces on the Cisco 7513 router. As the POP infrastructure installation and configuration processes are uniform across all managed firewall service models explored in this analysis, the costs associated with these processes will not be quantified.

Network-Based Model in Accordance with the Present Invention—Architecture Four

IP Service Delivery Platform 300 that includes an IP Service Processing Switch (IPSX 230), a Service Management System (SMS 221) and a Customer Network Management System (CNMS 222).

Figure 13:
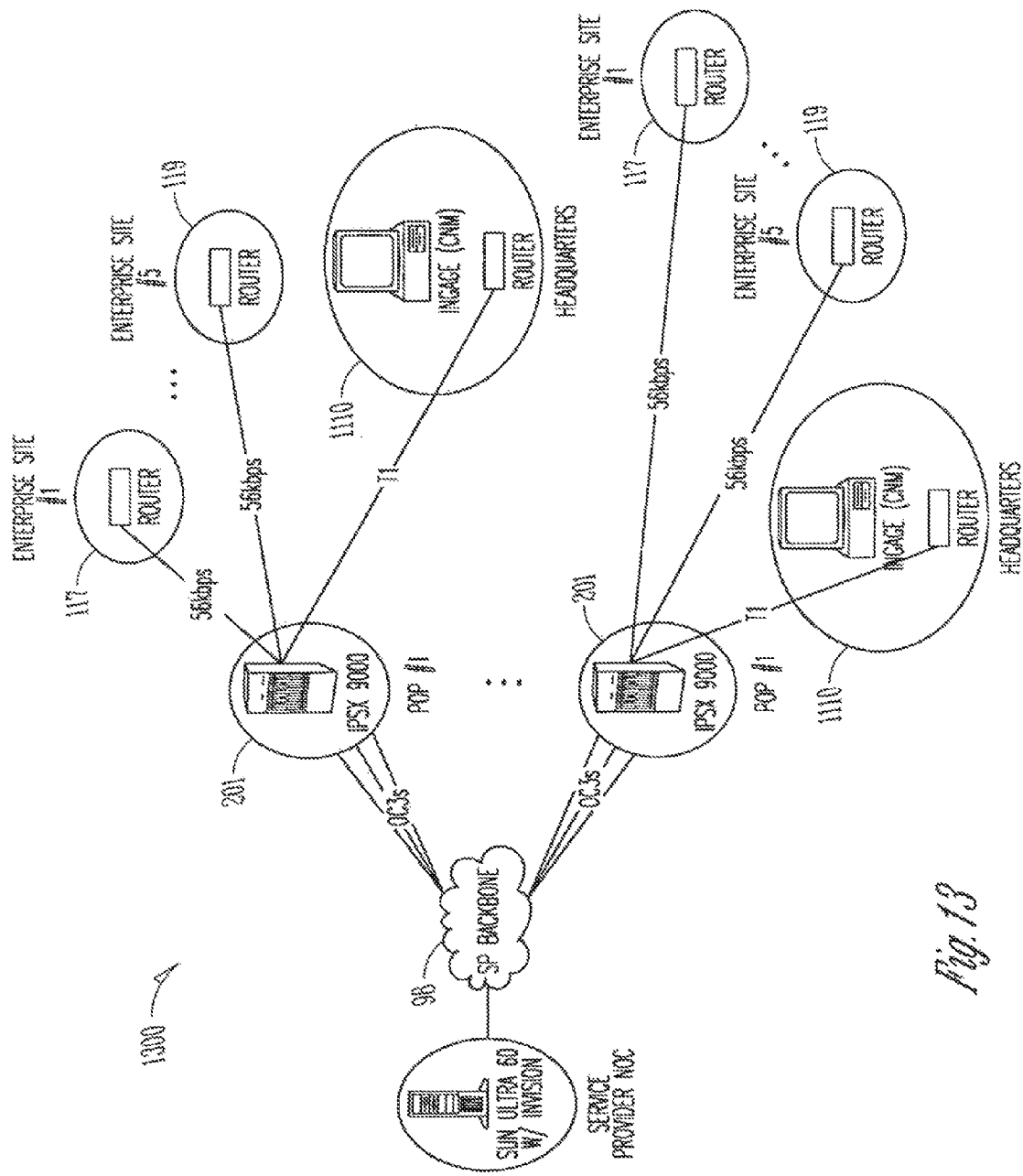
FIG. 13 shows a block diagram of a system for comparison.

This architecture employs an IP Service Processing Switch and a software-based centralized SMS to deliver a managed firewall solution. The specific components of this solution include:
1. IPSX 230 (IP Service Processing Switch) at service provider POP
2. Service Management System 221 on Sun Ultra 60 server at service provider NOC
3. InGage™ Customer Network Management System at the subscriber's headquarters FIG. 13 shows a block diagram of a system 1300 that provides a Managed Firewall Service with CoSine's Network-based Solution in accordance with the present invention.

Figure 14:
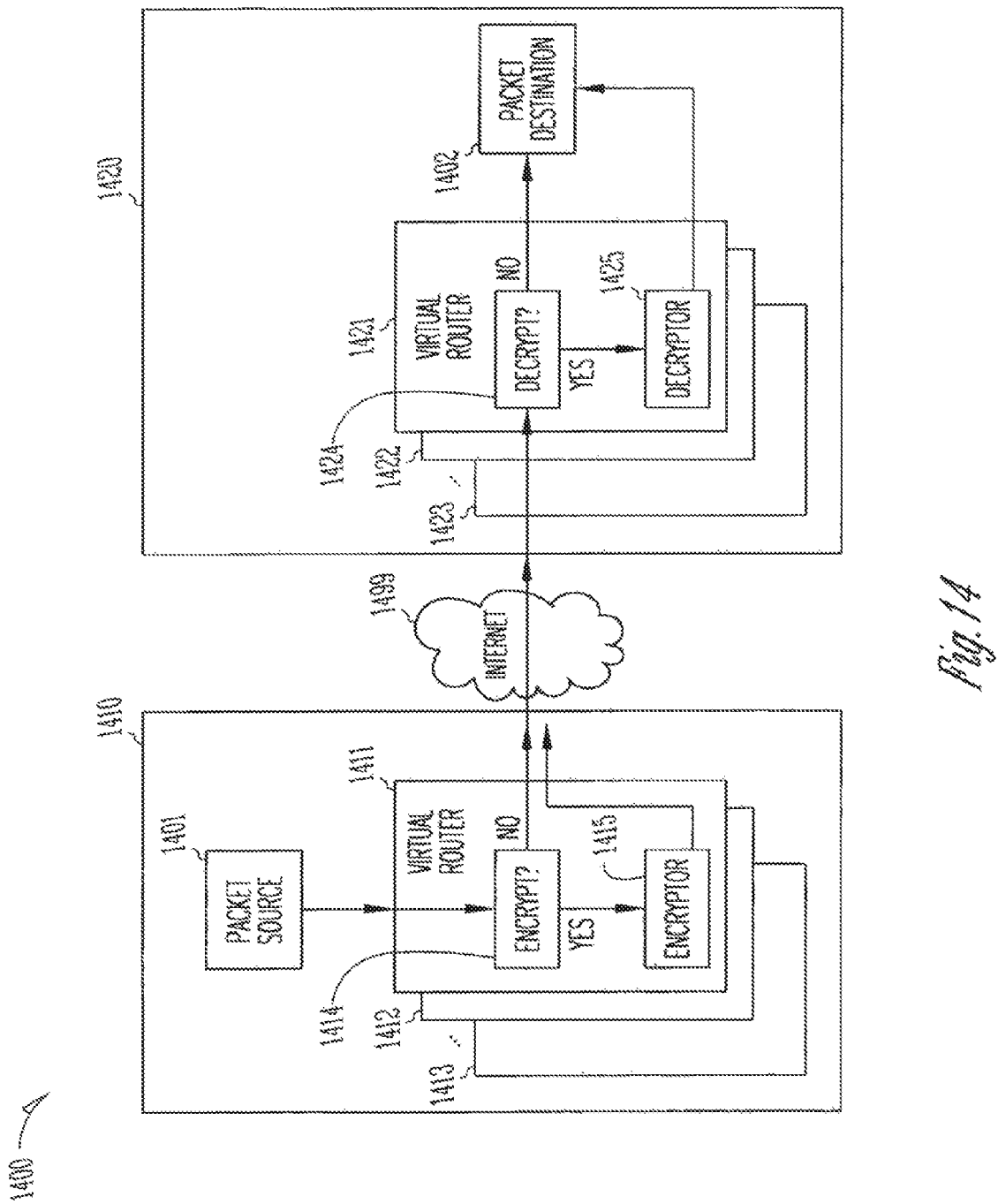
FIG. 14 shows a block diagram of a system in accordance with an embodiment of the present invention.

FIG. 14 shows a block diagram of a system 1400 in accordance with the present invention. System 1400 includes a first processing system 1410 and a second processing system 1420, each of which, in some embodiments, has a plurality of processors such that they can be incrementally expanded. In some embodiments, one or both of the first and second processing systems includes one or more control processors, one or more access processors, and one or more processing processors, as described above. In such systems, packets will be transmitted both ways, but for simplicity of explanation, packets transmitted from system 1410 to 1420 are explained. The same explanation can be applied to packets going the other direction. System 1410 includes a source of data packets 1401, and system 1420 has the destination 1402 for these packets. In some embodiments, one or more virtual routers 1411 (and possibly 1412 and 1413) are provided in system 1410, wherein a separate virtual router can be assigned to each of a plurality of different customers. Thus each customer views the system 1410 has having only its router (e.g., virtual router 1411 for a first customer, virtual router 1412 for a second customer, etc.) and each customer does not "see" the other virtual routers for the other customers. These other customers would have other packet sources (not shown) to supply packets to their virtual routers. Similarly, in some embodiments, system 1420 includes one or more virtual routers 1421 (and possibly 1422 and 1423), wherein a separate virtual router can be assigned to each of a plurality of different customers. Thus each customer views the system 1420 has having only its one router (e.g., virtual router 1421 for the first customer, virtual router 1422 for another customer, etc.) and each customer does not "see" the other virtual routers for the other customers. The IP SEC mode provides that each transmitting virtual router examines each packet (e.g., by the encrypt-bit detection block 1414) being sent to see if it is to be encrypted or not (e.g., by examining a bit in the packet), and if so passes the packet to encryptor 1415, which encrypts the packet using a suitable encryption method (many of which are known in the art, such as standard public-key/private-key IP encryption). The virtual router 1411 would then route the encrypted packet to virtual router 1421. Since encryption takes time, router 1411 typically will not encrypt every packet, but will instead examine each packet to determine whether to encrypt or not. Similarly, virtual router 1421 will examine each incoming packet using decrypt-detection block 1424 being received to see if it is to be decrypted or not (e.g., by examining a bit in the packet), and if so passes the packet to decryptor 1425, which decrypts the packet using a suitable decryption method corresponding to the encryption method of encryptor 1415. The decrypted packets are then routed to the packet destination 1402. As is typical for Internet packet transmission, there may be any number of other intermediate nodes (not shown) between router 1411 and router 1421, wherein packets are received and sent on towards their destination by each intermediate router along the way. If a virtual private network (VPN) is desired between packet source 1401 and packet destination 1402, (e.g., by forming a tunnel for the packets) then every packet is marked as requiring encryption and decryption for as long as the connection is maintained. In some embodiments, the detection of whether to encrypt or not, as described just above, is thus redundant. However, other virtual routers (e.g., 1412 and 1413) may desire to send packets that are not to be encrypted, and thus each virtual router 1411, 1412, and 1413 are configured to test each outgoing packet, and each virtual router 1421, 1422, and 1423 are configured to test each ingoing packet, to determine whether or not to encrypt or decrypt.

Figure 15:
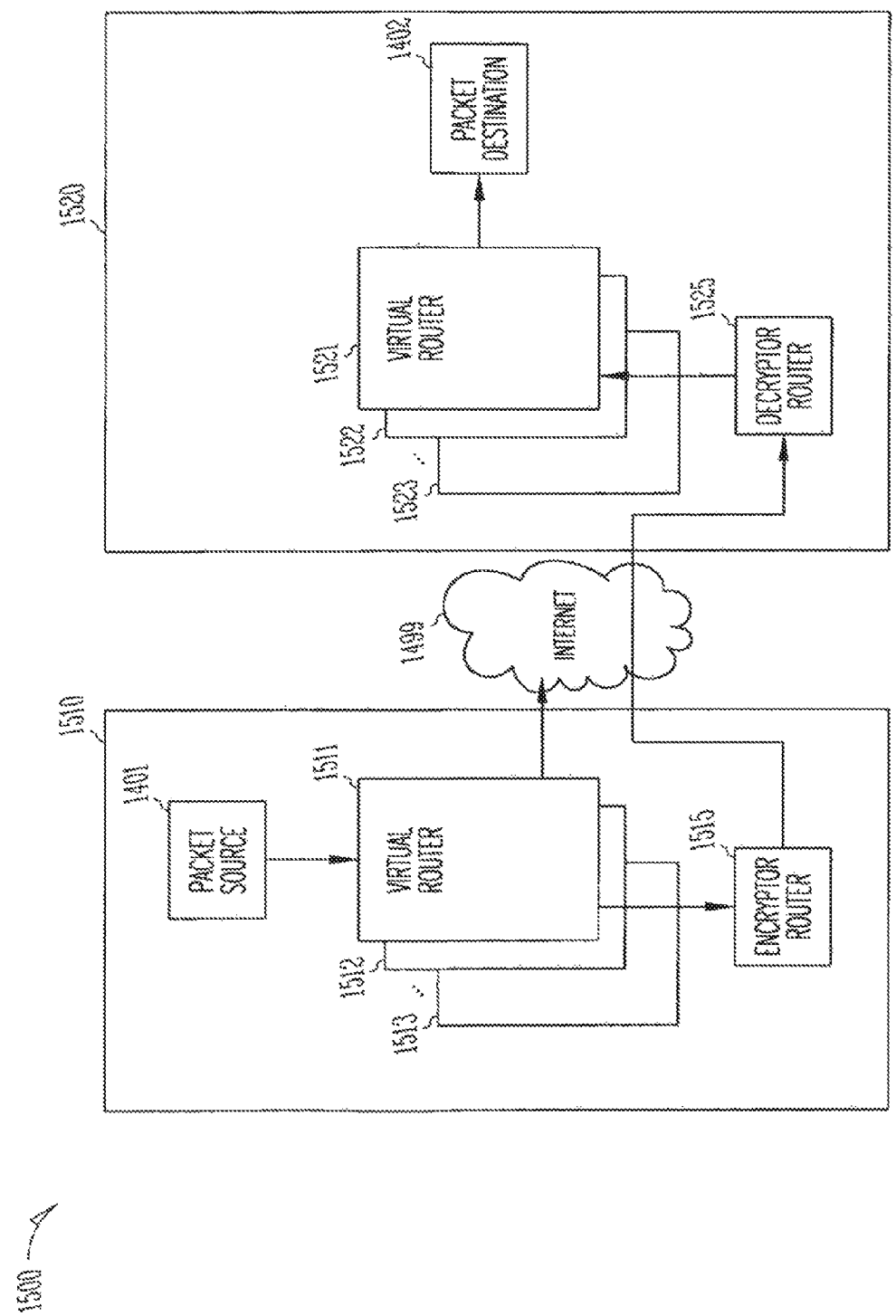
FIG. 15 shows a block diagram a system in accordance with an alternative embodiment of the present invention.

FIG. 15 shows a block diagram of a system 1500 in accordance with an alternative embodiment of the present invention. A first processing system 1510 includes one or more virtual routers 1511, 1512, and 1513, and a second first processing system 1520 includes one or more virtual routers 1521, 1522, and 1523. In some embodiments, at least one of the virtual routers 1511 does not examine each packet (i.e., to determine whether or not to encrypt), but instead is set up as part of a tunnel, wherein all tunnel traffic is encrypted. Thus all traffic going out of virtual router 1511 goes to encryptor router (or node) 1515, which encrypts all of its traffic and then routes those encrypted packets onto the Internet, destined for decryptor router (or node) 1525. There, all traffic is decrypted (without needing to examine each packet to determine whether or not to decrypt), and then routed to the appropriate one of virtual routers 1521, 1522, or 1523. Traffic to virtual router 1521 is then sent to packet destination 1402. Thus, in system 1500, the setting up of the tunnel across the Internet between the packet source 1401 and the packet destination 1402 includes a sending virtual router 1511 which need not examine every packet, but instead inserts the encryption node or router 1515 into the path for every packet. The encryption node 1515 simply becomes one more node along the path between the source 1401 and the destination 1402. Each virtual router 1511 to 1513 can share the same encryption node 1515 if it is set up to be sending tunnel traffic. Those nodes not sending tunnel traffic can simply bypass the encryption node 1515 (and those virtual routers 1513 can, in some embodiments, examine each packet as described above to determine whether or not to encrypt, or can simply assume that all its traffic is not to be encrypted). This simplification also applies to the decryption side in system 1520.

POP Infrastructure

The POP access infrastructure in the network-based managed firewall service model is based on the CoSine Communications IPSX 9000 Service Processing Switch. The base configuration for the switch includes:
1. 26-slot chassis
2. Redundant power supply
3. IPNOS Base Software
4. Ring Bridge & Ring Bridge Pass-Thru (to complete midplane)
5. Control Blade (for communications with Invision Services Management System)
6. Dual-port Channelized DS3 Access Blade
7. Dual-port Unchannelized DS3 Access Blades
8. Processor Blade
9. OC-3c POS Trunk Blade Analysis Analysis of the four service delivery architectures for deploying a managed firewall service reveals extremely compelling data in favor of implementing the network-based model based on the CoSine Communications IP Service Delivery Platform. Significant advantages are gained by utilizing this model in each of the following areas:

Operational "Soft" Costs

The network-based managed firewall solution eliminates most of the steep operational costs that are associated with deploying a CPE-based solution, specifically the per site truck roll and device installation charges. The CheckPoint server-based CPE deployment and installation operational costs alone exceed the total five-year capital equipment investment required in the CoSine Communications network-based model. Though the installation and configuration costs for the POP and NOC build-outs are not quantified in this study due to the uniformity of these processes across all solutions, it is worthy to note that the greater capacity of the CoSine IPSX 9000 Service Processing Switch and Invision Service Management System result in fewer components (switch chassis, NOC servers and software) that need to be installed and configured.

Time to Market, Time to Revenue

The network-based managed firewall solution enables service providers to greatly shorten the lead-time required to deploy the managed firewall service. The removal of the CPE component from the service offering eliminates the need to procure the device, eliminating a delay in service rollout. This also eliminates the delay that is associated with scheduling an onsite installation.

Complexity

The network-based managed firewall solution greatly reduces the complexity associated with deploying the service. The number of distributed devices is reduced from thousands of remote customer sites to only a few already staffed POPs, simplifying management and maintenance significantly.

The network-based managed firewall service model creates a new source of revenue for service providers that is scalable, repeatable, and cost-effective. Leveraging centrally-managed services enables service providers to derive greater value from the existing basic access infrastructure. The network-based model eliminates expensive onsite installation and maintenance required of CPE-based solutions, and provides a foundation to deploy additional value-added services via the same delivery mechanism. Elimination of the CPE device also effectively hides the technology of the managed firewall solution from the customer, reducing internal network complexity and technical anxiety.

One aspect of the present invention provides a method of packet routing. The method includes connecting a plurality of processors in a network, assigning a unique processor identifier (PEID) to each of the processors, routing a first packet to a first one of the processors across the network, wherein each such packet includes a PEID value corresponding to a PEID of one of the processors, and wherein the routing to the first processor is based on the PEID value in the first packet, establishing a plurality of objects in the first processor, assigning a logical queue identifier (LQID) to a first one of the objects in the first processor, wherein each packet also includes an LQID value corresponding to an LQID of one of the objects, and routing the first packet to the first object based on the LQID value in the first packet.

Some embodiments further include assigning a plurality of different LQIDs to the first object.

Some embodiments further include routing a plurality of packets, each having a different LQID, to the first object based on the LQID value in each respective packet.

In some embodiments, the first object is associated with a virtual router (VR).

Some embodiments further include establishing the first LQID with the first object to be used for point-to-point data traffic, and establishing a second LQID with the first object to be used for shortcut data traffic.

In some embodiments, the network is configured in a ring topology.

Another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, a plurality of objects in the first processor, wherein each such object is assigned a logical queue identifier (LQID), wherein each packet also includes an LQID value corresponding to an LQID of one of the objects, and software for routing the first packet to the first object based on the LQID value in the first packet.

In some embodiments, a plurality of different LQIDs are simultaneously assigned to the first object.

In some embodiments, the means for routing includes means for routing a plurality of packets, each having a different LQID, to the first object based on the LQID value in each respective packet.

In some embodiments, the first object is associated with a virtual router (VR).

In some embodiments, the first LQID is associated with the first object to be used for point-to-point data traffic, and a second LQID is associated with the first object to be used for shortcut data traffic.

In some embodiments, the network is configured in a ring topology.

Still another aspect of the present invention provides a system for routing packets. This system includes a plurality of processors coupled to one another using a network, wherein each of the processors a unique processor identifier (PEID), wherein a first packet is routed into a first one of the processors across the network, wherein each such packet includes a PEID value corresponding to a PEID of one of the processors, and wherein the routing to the first processor is based on the PEID value in the first packet, and a plurality of objects in the first processor, wherein each such object is assigned a logical queue identifier (LQID), wherein each packet also includes an LQID value corresponding to an LQID of one of the objects, wherein the first packet is routed to the first object based on the LQID value in the first packet.

Some embodiments further include a services management system that provides changeable provisioning of processor capacity among a plurality of customers.

Some embodiments further include a services management system that provides firewall protection for each of a plurality of customers.

The network-based managed firewall service model creates a new source of revenue for service providers that is scalable, repeatable, and cost-effective. Leveraging centrally-managed services enables service providers to derive greater value from the existing basic access infrastructure.

The network-based model eliminates expensive onsite installation and maintenance required of CPE-based solutions, and provides a foundation to deploy additional value-added services via the same delivery mechanism. Elimination of the CPE device also effectively hides the technology of the managed firewall solution from the customer, reducing internal network complexity and technical anxiety.

The CoSine Communications IP Service Delivery Platform 300 enables service providers to reap the benefits of deploying a network-based managed firewall service. The IPSX 9000 Service Processing Switch is a robust, high-availability platform that is capable of supporting hundreds of customer sites and network-based firewalls. The InVision Services Management System is capable of rapidly provisioning and managing thousands of managed firewall customers throughout an extensive nationwide network, enabling service providers to leverage volume security services driven by fewer staff resources. And the InGage™ Customer Network Management System empowers customer IT managers to view and augment managed network services. The IP Service Delivery Platform positions service providers to continuously deploy new value-added services to their customer base, maximizing revenues and creating customer lock-in.

Service providers utilizing the IP Service Delivery Platform 300 are to gain a significant competitive edge in deploying high-value IP-based services. The CoSine Communications solution enables services providers to save on the capital costs associated with deploying a managed firewall service over traditional CPE-based approaches. Additionally, the CoSine solution of the present invention virtually eliminates the steep operational "soft" costs that plague the CPE approach. Furthermore, as customer numbers and bandwidth requirements increase over time, so do the cost savings. This enables service providers to gain a cost-leadership position while greatly increasing revenues.

The IP Service Delivery Platform (IPSDP 300) is an ideal solution for service providers seeking to offer high value managed, network-based firewall services.

In some embodiments, a set of one or more management consultants to the networking industry help equipment vendors, service providers and enterprises make strategic decisions, mitigate risk and affect change through business and technology consulting engagements. This approach is tailored to each client's specific issues, objectives and budget.

These consultants are leaders in the networking industry and influence its direction though confidential engagements for industry leaders and through public appearances and trade magazine articles. These interactions assure clients that they will be among the first to know of the latest industry concepts and emerging technology trends.

Each consulting engagement is uniquely structured-no forced methodologies or canned reports are employed. An integrated client/management consultant case team respecting and soliciting the opinions of everyone is formed for each engagement.

Embodiments of the present invention provide a flexible, scalable hardware and software platform that allows a service provider to easily provide Internet services, virtual private network services, firewall services, etc., to a plurality of customers. This solution can be changes to provision each customer with more or less processing power and storage, according to individual changing needs.

One aspect of the present invention provides a method of delivering security services. This method includes connecting a plurality of processors 930 in a ring configuration within a first processing system, establishing a secure connection between the processors in the ring configuration across an Internet protocol (IP) connection to a second processing system to form a tunnel, and providing both router services and host services for a customer using the plurality of processors in the ring configuration and using the second processing system.

In some embodiments, one or more processors are operable to support a communications network, the plurality of processors includes one or more control processors, one or more access processors, and one or more processing processors.

In some embodiments, for each of a plurality of customers, a virtual router 210 is formed in the first processing system 401 and is operably connected to a virtual router 210 formed in the second system 402.

In some embodiments, for each of a plurality of customers, a virtual private network 410 is formed using a virtual router 210 formed in the first processing system 401 and operably connected to a virtual router 210 formed in the second system 402.

In some embodiments, the connecting a plurality of processors in the ring configuration includes forming dual counter rotating ring connections 933 and 934, each connecting to each of the plurality of processors 930.

Another aspect of the present invention provides a system of delivering security services. This system 201 includes a plurality of processors 230 in a ring configuration within a first processing system 401, and means for establishing a secure connection 418 between the processors in the ring configuration 411 across an Internet protocol (IP) connection to a second processing system 412 to form a tunnel, and for providing both router services and host services for a customer using the plurality of processors in the ring configuration 411 and using the second processing system 412.

In some embodiments, to support a communications network, the plurality of processors includes one or more control processors, one or more access processors, and one or more processing processors.

In some embodiments, for each of a plurality of customers, a virtual router is formed in the first processing system and is operably connected to a virtual router formed in the second system.

In some embodiments of this system, for each of a plurality of customers, a virtual private network is formed using a virtual router formed in the first processing system and operably connected to a virtual router formed in the second system.

In some embodiments of this system, the plurality of processors in the ring configuration includes dual counter rotating ring connections, each connecting to each of the plurality of processors.

Yet another aspect of the present invention provides a system 201 for delivering security services. This second system 201 includes a plurality of processors within a first processing system connected in a ring configuration, and a tunnel formed using a secure connection between the processors in the ring configuration across an Internet protocol (IP) connection to a second processing system, wherein both router services and host services are provided for a customer using the plurality of processors in the ring configuration and using the second processing system.

In some embodiments of this second system, to support a communications network, the plurality of processors 930 includes one or more control processors 234, one or more access processors 238, and one or more processing processors 236. In some embodiments, one or more of these processors is packaged on a blade 239.

In some embodiments of this second system, for each of a plurality of customers, a virtual router 210 is formed in the first processing system 401 and is operably connected to a virtual router 210 formed in the second system 402.

In some embodiments of this second system, for each of a plurality of customers, a virtual private network 410 is formed using a virtual router 210 formed in the first processing system 401 and operably connected to a virtual router 210 formed in the second system 410.

In some embodiments of this second system, the plurality of processors 230 in the ring configuration includes dual counter rotating ring connections 932 and 933, each connecting to each of the plurality of processors 930.

Some embodiments of this second system further include a services management system 221 that provides changeable provisioning of processor capacity among a plurality of customers.

Some embodiments of this second system further include a services management system 221 that provides firewall protection for each of a plurality of customers.

Some embodiments of this second system further include a services management system 221 that provides provisioning of processor capacity among a plurality of customers, wherein each customer's resources are isolated from those of all the other customers.

Another aspect of the present invention provides a method of delivering security services, for example by forming a secure tunnel between a source site and a destination site. The method includes establishing a first routing node within a first processing system, establishing a second routing node within a second processing system, establishing a first Internet protocol (IP) connection communications path between the first processing system and the second processing system that includes the first routing node and the second routing node, receiving a plurality of data packets into the first routing node, encrypting all of the received packets, without regard to any indication in the received packets, to form encrypted packets, sending the encrypted packets from the first routing node to the second routing node, receiving the encrypted packets into the second routing node, decrypting all of the received encrypted packets, without regard to any indication in the received encrypted packets, to form decrypted packets, and sending the decrypted packets from the second routing node to a destination in the second processing system.

In some embodiments, to support a communications network, the first processing system includes one or more control processors, one or more access processors, and one or more processing processors.

In some embodiments, for a first customer, a virtual router forms the first routing node in the first processing system and is operably connected to a virtual router that forms the second routing node in the second processing system.

In some embodiments, for each of a plurality of customers, a virtual private network is formed using a virtual encrypting router formed in the first processing system and operably connected to a virtual decrypting router formed in the second processing system.

In some embodiments, establishing the first routing node in the first processing system includes connecting a plurality of processors in a ring configuration.

In some embodiments, the connecting the plurality of processors comprises connecting the plurality of processors in a ring configuration, and wherein the connecting a plurality of processors in the ring configuration includes forming dual counter rotating ring connections, each connecting to each of the plurality of processors.

Yet another aspect of the present invention provides a system of delivering security services. This system includes a first processing system, a second processing system, and means for establishing a secure connection between the processors across an Internet protocol (IP) connection to a second processing system to form a tunnel, wherein the secure connection encrypts all packets going into the tunnel and decrypts all packets coming from the tunnel.

In some embodiments, to support a communications network, the first processing system includes one or more control processors, one or more access processors, and one or more processing processors.

In some embodiments, for each of a plurality of customers, a virtual router is formed in the first processing system and is operably connected to a virtual router formed in the second system.

In some embodiments, for each of a plurality of customers, a virtual private network is formed using an encrypting virtual router formed in the first processing system and operably connected to a decrypting virtual router formed in the second system.

In some embodiments, the one or more control processors, the one or more access processors, and the one or more processing processors are connected by dual counter-rotating ring connections, each connecting to each of the plurality of processors.

Still another aspect of the present invention provides a system 1500 of delivering security services, This system includes a first processing system 1510, a second processing system 1520, and a first routing node 1515 within the first processing system, and a second routing node 1525 within the second processing system, wherein the first routing node 1515 encrypts all packets routed to it and forwards encrypted packets to the second routing node 1525, and the second routing node 1525 decrypts the encrypted packets sent from the first routing node and sends the decrypted packets from the second routing node to a destination 1402 in the second processing system 1520.

In some embodiments of system 1500, to support a communications network, the first processing system includes one or more control processors, one or more access processors, and one or more processing processors.

In some embodiments of system 1500, for each of a plurality of customers, an encrypting virtual router 1511 is formed in the first processing system 1510 and is operably connected to a decrypting virtual router 1521 formed in the second processing system 1520.

In some embodiments of system 1500, for each of a plurality of customers, a virtual private network is formed using an encrypting virtual router formed in the first processing system and operably connected to a decrypting virtual router formed in the second system.

Some embodiments of system 1500 include one or more control processors, one or more access processors, and one or more processing processors connected in a ring configuration that includes dual counter rotating ring connections, each connecting to each of these plurality of processors.

Some embodiments further include a first virtual router in the first processing system that receives packets to be sent and routes such packets to the first routing node for encryption. Some embodiments further include a second virtual router in the second processing system that receives packets from the second routing node after decryption and routes such packets towards a destination.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising:
    instantiating, within each of a plurality of service processing switches of a service provider, a plurality of virtual routers (VRs), wherein each VR of the plurality of VRs is supported by an object group and each object of the object group supports a network service;
    assigning one or more VRs of the plurality of VRs to a subscriber of a plurality of subscribers of the service provider;
    receiving, by a service management system (SMS) of the service provider, a request to establish a Virtual Private Network (VPN) connection between a first premises of the subscriber and a second premises of the subscriber; and
    establishing a tunnel in support of the VPN connection between a first service processing switch of the plurality of service processing switches and a second service processing switch of the plurality of service processing switches coupled in communication with the first service processing switch through a public Internet Protocol (IP) network, including:
        configuring a first packet routing node of the first service processing switch, for as long as the VPN connection is maintained, (i) to cause all packets transmitted via the tunnel from the first premises to the second premises to be encrypted prior to transmission through the public IP network and (ii) to cause all packets received via the tunnel from the second premises to be decrypted; and
        configuring a second packet routing node of the second service processing switch, for as long as the VPN connection is maintained, (i) to cause all packets transmitted via the tunnel from the second premises to the first premises to be encrypted prior to transmission through the public IP network and (ii) to cause all packets received via the tunnel from the first premises to be decrypted.

2. The method of claim 1, wherein the object group includes a routing object, a packet filtering object, a firewall object and a network address translation (NAT) object.

3. The method of claim 1, wherein each VR of the plurality of VRs comprises a separate instantiation.

4. The method of claim 1, wherein the SMS is operable to perform services including one or more of: configuration of hardware of the service processing switch, definition of subscribers, determination of network services and generation of Internet Protocol security (IPSec) public/private key pairs.

5. The method of claim 1, further comprising providing customized network services to the subscriber by the one or more VRs assigned to the subscriber, wherein the customized network services can be enabled or disabled on a subscriber-by-subscriber basis by adding one or more objects to or omitting the one or more objects from the object group.

6. The method of claim 1, further comprising:
    assigning a unique processor identifier (PEID) to each of a plurality of processors of the service processing switch;
    assigning a logical queue identifier (LQID) to each object of an object group of a VR of the plurality of VRs;

receiving, by the service processing switch, a packet that includes a PEID value and an LQID value;

directing the received packet to a processor of the plurality of processors to which the PEID value has been assigned; and further directing the received packet within the processor to an object of the object group to which the LQID value has been assigned.

7. The method of claim 1, wherein the tunnel is formed using a first virtual encrypting router running in the first service processing switch coupled to a first virtual decrypting router running in the second service processing switch and a second virtual encrypting router running in the second service processing switch coupled to a second virtual decrypting router running in the first service processing switch.

8. A system comprising:

a service management system (SMS) within a network of a service provider ("service provider network");

a plurality of virtual routers (VRs) instantiated within a plurality of service processing switches within the service provider network, wherein each VR of the plurality of VRs is supported by an object group and each object of the object group supports a network service;

wherein the SMS:

assigns one or more of the plurality of VRs to a subscriber of a plurality of subscribers of the service provider;

receives a request to establish a Virtual Private Network (VPN) connection between a first premises of the subscriber and a second premises of the subscriber; and establishes a tunnel between a first service processing switch of the plurality of service processing switches and a second service processing switch of the plurality of service processing switches coupled in communication with the first service processing switch through a public Internet Protocol (IP) network by:

configuring a first packet routing node of the first service processing switch, for as long as the VPN connection is maintained, (i) to cause all packets transmitted via the tunnel from the first premises to the second premises to be encrypted prior to transmission through the public IP network and (ii) to cause all packets received via the tunnel from the second premises to be decrypted; and configuring a second packet routing node of the second service processing switch, for as long as the VPN connection is maintained, (i) to cause all packets transmitted via the tunnel from the second premises to the first premises to be encrypted prior to transmission through the public IP network and (ii) to cause all packets received via the tunnel from the first premises to be decrypted.

9. The system of claim 8, wherein the object group includes a routing object, a packet filtering object, a firewall object and a network address translation (NAT) object.

10. The system of claim 8, wherein each VR of the plurality of VRs comprises a separate instantiation.

11. The system of claim 8, wherein the SMS further provides one or more of: configuration of hardware, defining subscribers, determining services, and generation of IP security (IPSec) public/private key pairs.

12. The system of claim 8, wherein the SMS further provides customized network services to a subscriber of the service provider network, wherein the customized network services can be enabled or disabled on a subscriber-by-subscriber basis by adding one or more objects to or omitting the one or more objects from the object group.

13. The system of claim 8, wherein the SMS further:

assigns a unique processor identifier (PEID) to each of a plurality of processors within the plurality of service processing switches;

assigns a logical queue identifier (LQID) to each object of an object group of a VR of the plurality of VRs;

directs the received packet to a processor of the plurality of processors to which the PEID value has been assigned; and further directs the received packet within the processor to an object of the object group to which the LQID value has been assigned.

14. The system of claim 8, wherein the first packet routing node comprises a first virtual encrypting router and a first virtual decrypting router running in the first service processing switch, wherein the second packet routing node comprises a second virtual encrypting router and a second virtual decrypting router running in the second service processing switch and wherein the first virtual encrypting router is coupled to the first virtual decrypting router and the second virtual encrypting router is coupled to the second virtual decrypting router.

* * * * *